United States Patent
Kawahara

(10) Patent No.: US 8,068,079 B2
(45) Date of Patent: Nov. 29, 2011

(54) LIQUID CRYSTAL DISPLAY APPARATUS

(75) Inventor: Norihiro Kawahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 628 days.

(21) Appl. No.: 12/249,420

(22) Filed: Oct. 10, 2008

(65) Prior Publication Data

US 2009/0102765 A1    Apr. 23, 2009

(30) Foreign Application Priority Data

Oct. 18, 2007 (JP) ................................. 2007-271852
Oct. 18, 2007 (JP) ................................. 2007-271853

(51) Int. Cl.
*G09G 3/36* (2006.01)

(52) U.S. Cl. .............................. 345/95; 345/87; 345/208

(58) Field of Classification Search .............. 345/50–54, 345/87–104, 208; 349/33–55, 192
See application file for complete search history.

(56) References Cited

U.S. PATENT DOCUMENTS

| | | | |
|---|---|---|---|
| 5,835,075 A * | 11/1998 | Nomura et al. ................... | 345/97 |
| 6,057,817 A * | 5/2000 | Ono et al. ........................ | 345/94 |
| 6,163,310 A * | 12/2000 | Jinno et al. ...................... | 345/87 |
| 6,507,330 B1 * | 1/2003 | Handschy et al. ............... | 345/94 |
| 7,218,302 B2 * | 5/2007 | Ide ................................... | 345/96 |
| 7,944,425 B2 * | 5/2011 | Watanuki et al. ................ | 345/94 |
| 2008/0309837 A1 * | 12/2008 | Abe .................................. | 349/37 |

FOREIGN PATENT DOCUMENTS

| | | |
|---|---|---|
| EP | 1055960 A2 * | 11/2000 |
| GB | 2429823 A * | 3/2007 |
| JP | 5-323336 | 12/1993 |
| JP | 8-201830 | 8/1996 |
| JP | 11-38389 | 2/1999 |
| JP | 2005-55562 | 3/2005 |
| WO | WO 2005/012986 | 2/2005 |

* cited by examiner

*Primary Examiner* — Amare Mengistu
*Assistant Examiner* — Dmitriy Bolotin
(74) *Attorney, Agent, or Firm* — Fitzpatrick, Cella, Harper & Scinto

(57) ABSTRACT

A liquid crystal display apparatus includes a liquid crystal modulation element configured to modulate light from a light source, and including a first electrode, a second electrode, a liquid crystal layer disposed between the first electrode and the second electrode, and a controller configured to provide a first potential to the first electrode and a second potential to the second electrode. While the light source is turned off, the controller provides a third potential to the first electrode and a fourth potential to the second electrode, such that the difference between the third and fourth potentials has a constant sign but a variable magnitude in an in-plane direction of the liquid crystal layer.

15 Claims, 13 Drawing Sheets

LIQUID CRYSTAL DISPLAY APPARATUS

BACKGROUND OF THE INVENTION

1. Field of the Invention

The present invention relates to a liquid crystal display apparatus using a liquid crystal modulation element, such as a liquid crystal projector.

2. Description of the Related Art

Some of the liquid crystal modulation elements are realized by sealing nematic liquid crystal having positive dielectric anisotropy between a first transparent substrate having a transparent electrode (common electrode) formed thereon and a second transparent substrate having a transparent electrode (pixel electrode) forming pixels, wiring, switching elements and the like formed thereon. The liquid crystal modulation element is referred to as a Twisted Nematic (TN) liquid crystal modulation element in which the major axes of liquid crystal molecules are twisted by 90 degrees continuously between the two glass substrates. This liquid crystal modulation element is used as a transmissive liquid crystal modulation element. Some of the liquid crystal modulation elements utilize a circuit substrate having reflecting mirrors, wiring, switching elements and the like formed thereon instead of the abovementioned second transparent substrate. This is called a Vertical Alignment (Arrangement) Nematic (VAN) liquid crystal modulation element in which the major axes of liquid crystal molecules are aligned in homeotropic alignment substantially perpendicularly to two substrates. The liquid crystal modulation element is used as a reflective liquid crystal modulation element.

In these liquid crystal modulation elements, typically, the Electrically Controlled Birefringence (ECB) effect is used to provide retardation for a light wave passing through a liquid crystal layer to control the change of polarization of the light wave, thereby forming an image with light.

The liquid crystal modulation element utilizes the ECB effect to modulate the light intensity, and the application of an electric field to the liquid crystal layer moves charged particles (ionic substances) present in the liquid crystal layer. When a DC electric field is continuously applied to the liquid crystal layer, the charged particles are drawn toward one of two opposite electrodes. Even when a constant voltage is applied to the electrodes, the electric field substantially applied to the liquid crystal layer is attenuated or increased by the charge of the charged particles.

To avoid such a phenomenon, a line inversion drive method is typically employed which inverts the polarity of an applied electric field between positive and negative polarities for each line of arranged pixels and changes the polarity in a predetermined cycle such as 60 Hz or the like. In addition, a field inversion drive method is also used which inverts the polarity of an electric field applied to all arranged pixels between positive and negative in a predetermined cycle. These drive methods can avoid the application of the electric field of only one polarity to the liquid crystal layer to prevent unbalanced ions.

However, the liquid crystal layer, and an outer wall member surrounding the liquid crystal layer and the like also include there inside charged particles. When the liquid crystal is driven in a high temperature environment in particular, these charged particles drift (or move) in the liquid crystal layer. These charged particles generate a DC electric field component in the liquid crystal layer, and attach to an interface between the liquid crystal layer and an alignment film or an electrode. Then, the charged particles drift and accumulate in a direction along which the liquid crystal molecules are aligned.

In a liquid crystal modulation element having an organic alignment film, in addition to the drifting of charged particles due to the driving of the liquid crystal under the high temperature environment, light entering the liquid crystal modulation element causes decomposition of organic materials forming the alignment film, the liquid crystal, a seal member or the like, causing the generation of charged particles. These charged particles also generate a DC electric field component in the liquid crystal layer, attach to the interface between the liquid crystal layer and the alignment film or the electrode, and then drift and accumulate in the direction along which the liquid crystal molecules are aligned.

The charged particles that have accumulated in a specific area in the liquid crystal layer change the effective electric field applied to the liquid crystal layer, thereby preventing an expected ECB modulation. This causes, for example, luminance unevenness in an effective display area of the liquid crystal modulation element, which deteriorates image quality.

Countermeasures applied against such a problem have been disclosed in International Publication No. 2005-012986 pamphlet and Japanese Patent Laid-Open Nos. 8-201830, 11-38389, and 5-323336.

International Publication No. 2005-012986 pamphlet discloses a method in which at least one of potentials of the pixel electrode and the electrode opposite thereto of a liquid crystal cell is set to a ground level during a period other than an image display operation period such that ions causing a burn-in phenomenon are dissociated from the interface between the liquid crystal layer and the alignment film or the electrodes.

Japanese Patent Laid-Open No. 8-201830 discloses a method in which an ion trap electrode area is provided in a non-display area of a liquid crystal modulation element, and a direct voltage is applied to the ion trap electrode such that ionic impurities are absorbed by the ion trap electrode area of the non-display area having no influence on image display.

Japanese Patent Laid-Open No. 11-38389 discloses a method in which a metal film electrode is provided at a position different from that of the pixel electrode to apply a direct voltage between the metal film electrode and a common electrode, thereby reducing the concentration of movable ions in a display area to suppress a flicker phenomenon.

Furthermore, Japanese Patent Laid-Open No. 5-323336 discloses a method in which ion trap electrodes are provided independently of a transparent electrode at opposing surfaces of two electrode substrates provided in the vicinity of a liquid crystal enclosing portion, and a voltage is applied to the ion trap electrodes to trap ionic impurities.

As described above, the voltage control from the outside can control the charged particles in the liquid crystal modulation element to provide displayed images of good quality.

However, the method disclosed in International Publication No. 2005-012986 needs in a circuit of the liquid crystal modulation element a switching part for setting the potential of the opposite electrodes to the ground level. This increases the number of steps of manufacturing the liquid crystal modulation element. Furthermore, the setting of the potential of the opposite electrodes to the ground level is not sufficiently effective because forces for pulling off the ions that have attached to the interface of the liquid crystal layer and the alignment film or the electrode are weaker than coulomb forces.

Similarly, the methods disclosed in Japanese Patent Laid-Open Nos. 8-201830, 11-38389, and 5-323336 also need to newly provide the ion trap electrode for attracting the ions in the non-display area, so that the number of the manufacturing steps increases. Moreover, although in these disclosed methods the ionic impurities are drawn by the coulomb force, the coulomb force is inversely proportional to the square of a distance from the ion trap electrode, so that the ions generated at a position away from the ion trap electrode cannot be efficiently attracted.

SUMMARY OF THE INVENTION

The present invention provides a liquid crystal display apparatus that can avoid the influence by the accumulated charged particles in the liquid crystal layer without adding a new member such as the switching part or the ion trap electrode to the liquid crystal modulation element.

A liquid crystal display apparatus according to a first aspect of the present invention includes a liquid crystal modulation element configured to modulate light from a light source, and including a first electrode, a second electrode, a liquid crystal layer disposed between the first electrode and the second electrode, a first alignment film disposed between the first electrode and the liquid crystal layer, and a second alignment film disposed between the second electrode and the liquid crystal layer, and a controller configured to provide a first potential to the first electrode and a second potential to the second electrode such that a sign of an electric field generated in the liquid crystal layer is cyclically inverted and to make the liquid crystal modulation element perform a light modulation operation. While the light source is turned off, the controller provides a third potential to the first electrode and a fourth potential to the second electrode, such that the difference between the third and fourth potentials has a constant sign but a variable magnitude in an in-plane direction of the liquid crystal layer.

The third potential and the fourth potential are provided to the first electrode and the second electrode, respectively, such that the sign of the electric field generated in the liquid crystal layer is fixed and the difference between the potentials varies in an in-plane direction of the liquid crystal layer while the light source is being turned off. Then the charged particles that have a distribution in the liquid crystal layer can be forcibly diffused in the liquid crystal layer. This can suppress the image deterioration caused by the accumulation of the charged particles, while preventing an unnatural looking image, due to the third and fourth applied potentials, from being shown to the observer without adding a new member, such as the switching part or the ion trap electrode, to the liquid crystal modulation element.

The liquid crystal display apparatus according to a second aspect of the present invention includes a liquid crystal modulation element configured to modulate light from a light source, and including a first electrode, a second electrode, a liquid crystal layer disposed between the first electrode and the second electrode, a first alignment film disposed between the first electrode and the liquid crystal layer, and a second alignment film disposed between the second electrode and the liquid crystal layer, and a controller configured provide a first potential to the first electrode and a second potential to the second electrode such that the sign of an electric field generated in the liquid crystal layer is cyclically inverted and to make the liquid crystal modulation element perform a light modulation operation. The controller provides a third potential to the first electrode and a fourth potential to the second electrode, the difference between the third and fourth potentials having a constant sign and a variable magnitude in an in-plane direction of the liquid crystal layer before the effective light modulation area on the liquid crystal modulation element is changed from a first effective modulation area to a second effective modulation area and light modulation in the second effective light modulation area is started.

Other aspects of the present invention will become apparent from the following description and the attached drawings.

DESCRIPTION OF THE EMBODIMENTS

Exemplary embodiments of the present invention will hereinafter be described with reference to the accompanying drawings.

(A Configuration of a Display Apparatus)

Figure 1:
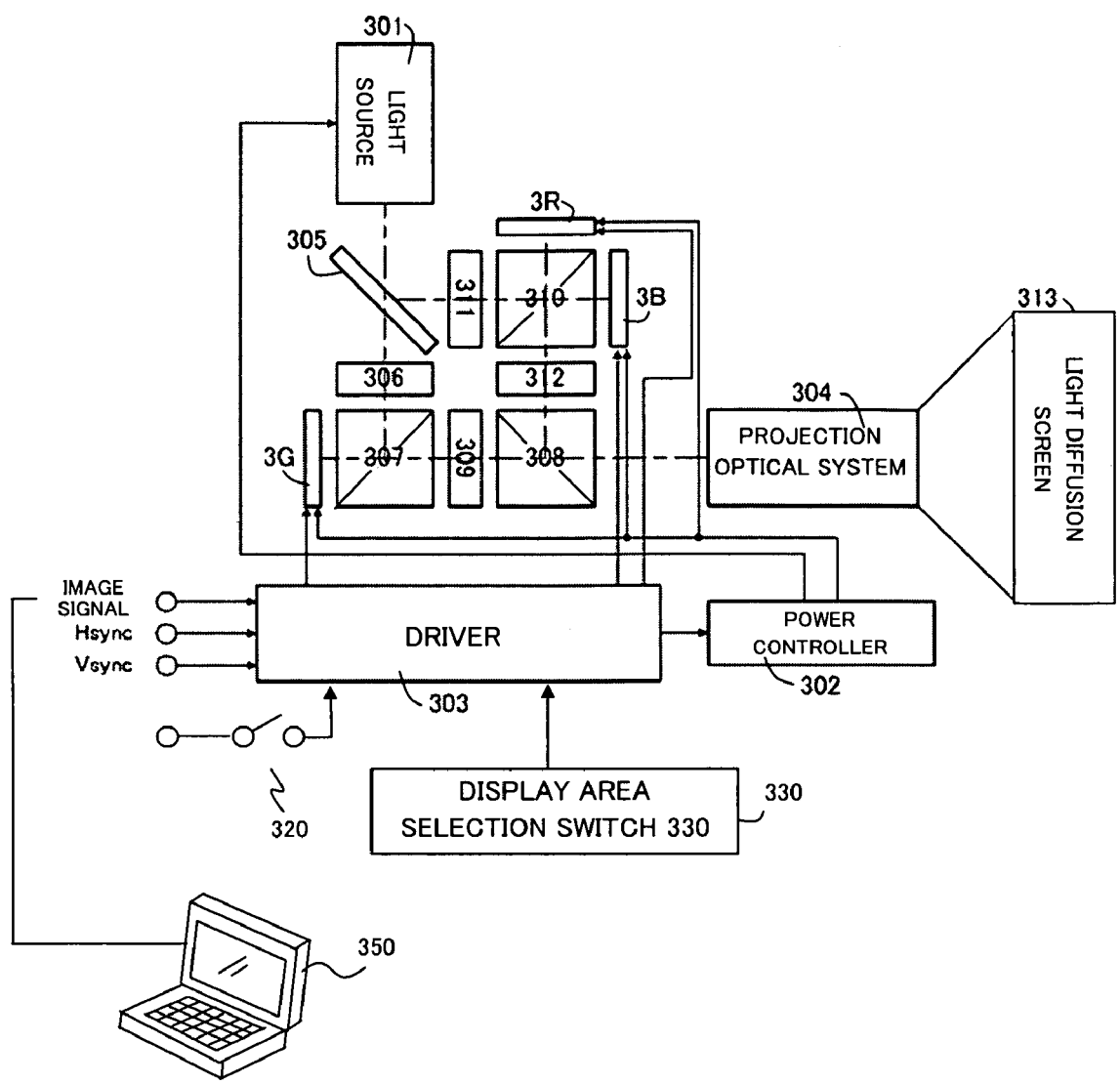
FIG. 1 shows a configuration of a liquid crystal projector according to first to fifth embodiments of the present invention.

FIG. 1 shows a configuration of a liquid crystal projector (an image projector apparatus) according to an embodiment of a liquid crystal display apparatus of the present invention.

Reference numeral 303 denotes a liquid crystal panel driver. An image signal, a horizontal synchronization signal ("Hsync"), and a vertical synchronization signal ("Vsync") from an image supplying device 350 such as a personal computer, a DVD player, or a television tuner are input into the driver 303. The driver 303 generates panel driving signals for red, green, and blue colors from the input signals. Each panel driving signal is input into a liquid crystal panel for red 3R, a liquid crystal panel for green 3G, and a liquid crystal panel for blue 3B as reflective liquid modulation elements respectively. This will allow three liquid crystal panels 3R, 3G, and 3B to be driven independently from one another.

Three liquid crystal panels have 1400×1050 pixels that correspond to the SXGA standard and 11.3 mm×8.5 mm effective display areas (whole pixel areas). They may have 1920×1080 pixels that correspond the full HD standard, and may use liquid crystal panels having a 15.4 mm×9.6 mm effective display areas (whole pixel areas)

Liquid crystal panels 3R, 3G, and 3B modulate (color separated) light from a light source which will be described later due to a light modulation operation, by modulating light in response to the panel driving signals. This configuration can display an image in response to each color component of image information input from the image supplying device 350.

Reference numeral 301 denotes a light source, and converts light from a lamp (not shown) into linearly polarized light having the same polarization direction (S-polarized light having a polarization direction perpendicular to a paper plane in the figure), and emits it as an illumination light.

Illumination light from the light source 301 is incident upon a dichroic mirror 305 configured to reflect a magenta color and to transmit a green color. The magenta color component in the illumination light is reflected by the dichroic mirror 305, and transmitted through a blue cross color polarizer 311 which provides a half-wave retardation to a blue polarizer. This can generate blue colored linearly polarized light (P-polarized light) having a polarization direction parallel to the paper plane in the figure, and red colored linearly polarized light (S-polarized light) having a polarization direction perpendicular to the paper plane in the figure.

The blue light component that is P-polarized light enters a first polarization beam splitter 310 and then is transmitted through its polarization splitting film toward the liquid crystal panel 3B for blue. The red light component that is S-polarized light enters the first polarization beam splitter 310 and then is reflected by its polarization splitting film toward the liquid crystal panel 3R for red.

The green light component that is S-polarized light and has been transmitted through the dichroic mirror 305 passes through a dummy glass 306 provided for correcting an optical path length for green and then enters a second polarization beam splitter 307. The green light component (S-polarized light) is reflected by a polarization splitting film of the second polarization beam splitter 307 toward the liquid crystal panel 3G for green.

As described above, the liquid crystal panels 3R, 3G, and 3B for red, green, and red are illuminated with the illumination light.

Each of the liquid crystal panels provides retardation for the entering illumination light (polarized light) in accordance with the modulation state of pixels arranged on the liquid crystal panel and reflects the entering illumination light. Of the reflected light from each liquid crystal panel, a polarized light component having the same polarization direction as that of the illumination light is returned along the optical path of the illumination light toward the light source 301.

Of the reflected light from each liquid crystal panel, a polarized light component (modulated light) having a polarization direction perpendicular to that of the illumination light travels in the following manner. The red modulated light from the liquid crystal panel 3R for red, which is P-polarized light, is transmitted through the polarization splitting film of the first polarization beam splitter 310 and then transmitted through a red cross color polarizer 312. The red cross color polarizer 312 provides retardation of one-half wavelength for red polarized light, so that the red P-polarized light is converted into S-polarized light by the red cross color polarizer 312. The red S-polarized light enters a third polarization beam splitter 308 and then is reflected by its polarization splitting film toward a projection optical system 304.

The blue modulated light from the liquid crystal panel 3B for blue, which is S-polarized light, is reflected by the polarization splitting film of the first polarization beam splitter 310, is transmitted through the red cross color polarizer 312 without receiving any retardation and then enters the third polarization beam splitter 308. The blue S-polarized light is reflected by the polarization splitting film of the third polarization beam splitter 308 toward the projection optical system 304.

The green modulated light from the liquid crystal panel 3G for green, which is P-polarized light, is transmitted through the polarization splitting film of the second polarization beam splitter 307, is transmitted through a dummy glass 309 provided for correcting an optical path length of green, and then enters the third polarization beam splitter 308. The green P-polarized light is transmitted through the polarization splitting film of the third polarization beam splitter 308 toward the projection optical system 304.

The red modulated light, the blue modulated light, and the green modulated light are thus color-combined, and the color-combined light is projected by the projection optical system 304 onto a light diffusion screen 313 that is a projection surface. As a result, a full-color image is displayed.

(Liquid Crystal Panels)

The red liquid crystal panel 3R, the green liquid crystal panel 3G, and the blue liquid crystal panel 3B used in this embodiment are reflective liquid crystal modulation elements of a vertical alignment mode (a VAN type, for example).

Reference numeral 320 denotes a power switch of the projector, and reference numeral 330 denotes a display area selection switch. A user may select (change) an effective display area (an effective light modulation area) in each liquid crystal panel by operating the display area selection switch 330. The effective modulation display area that can be selected in each liquid crystal panel includes pixel areas that correspond to the SXGA standard, the full the HD standard, and the HD standard. The effective display area according to this embodiment, which is the effective modulation area, is used for a light modulation operation in order to display an image for viewing corresponding to the input image signals to the liquid crystal panel driver 303, and does not include the area where a black mask, which will be described later, is formed (displayed).

The liquid crystal panel driver 303 outputs a command signal to a power controller 302 in response to on/off operation (power on/off) of the power switch 320. The power controller 302 controls the on/off operation for supplying the power to the liquid crystal panels 3R, 3G, and 3B, and on/off operation of the light (on/off) for supplying the power to the light source 301, in response to command signals from the liquid crystal panel driver 303. The liquid crystal panel driver 303 sets the effective display area on each liquid crystal display in response to selection signals from the display area selection switch 330. The controller comprises the liquid crystal panel driver 303 and the power controller 302.

Figure 2:
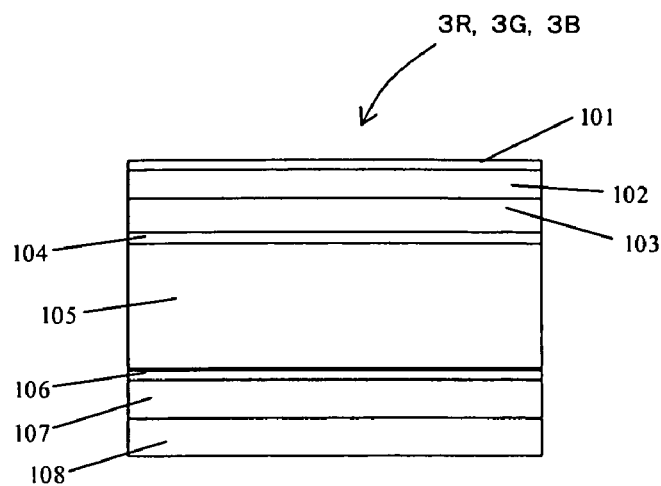
FIG. 2 is a sectional view showing the liquid crystal panel used according to the first to second embodiments.

FIG. 2 shows a sectional view of the structure of the liquid crystal panel which is common to the liquid crystal panel 3R for red, the liquid crystal panel 3G for green, and the liquid crystal panel 3B for blue.

In order from a side into which illumination light from the light source 301 enters, reference numeral 101 denotes an anti-reflection coat film, and reference numeral 102 denotes a glass substrate. Reference numeral 103 denotes a transparent electrode film (first electrode) that is made of ITO, for example, and formed on the glass substrate 102. Reference numeral 104 denotes a first alignment film disposed between the transparent electrode film 103 and a liquid crystal layer, which will be described later.

Reference numeral 105 denotes the liquid crystal layer disposed between the first alignment film 104 and a second alignment film 106. Reference numeral 107 denotes a reflective pixel electrode layer (second electrode) that is disposed on the opposite side of the liquid crystal layer 105 from the transparent electrode film 103 and is made of metal such as aluminum.

Reference numeral 108 denotes a Si substrate on which the reflective pixel electrode layer 107 is formed. The transparent electrode film 103 and the reflective pixel electrode 107 are generally referred to as opposing electrodes. Hereinafter, the transparent electrode film 103 and the reflective pixel electrode layer 107 may be collectively called as electrode layers.

Figure 10:
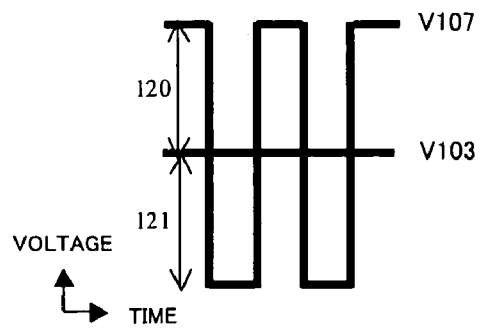
FIG. 10 shows normal AC driving of the liquid crystal panel according to the first to the fifth embodiments.

FIG. 10 shows a voltage applied to the electrode layers 103, 107 by the liquid crystal panel driver 303 in the state where the light is modulated by the liquid crystal panels 3R, 3G, and 3B with the light source 301 on (in a state with light modulation or display driving performed). The horizontal axis represents time and the vertical axis represents applied voltages. The liquid crystal panel driver 303 stores therein a computer program, and controls the voltages applied to the electrode layers 103 and 107 based on the program.

In the following description, the voltage applied to each electrode or the liquid crystal layer is a potential based on a ground level (0V), that is, a potential difference from the ground level.

An AC current voltage (second potential) V107 in which positive voltage 120 and negative voltage 121 alternate is applied to the reflective pixel electrode layer 107 with a specific period. The DC voltage (first potential) V103 is applied to the transparent electrode film 103.

The effective electric field generated in the liquid crystal layer 105 depends on a difference between the alternating voltage V107 and the direct voltage V103, and it is an alternating electric field in which a positive electric field and a negative electric field alternately switch with the specific cycle. Specifically, the potential difference generated in the liquid crystal layer 105 cyclically changes between positive and negative. In other words, in the present invention, the potential (potential difference) is provided to the electrode layers 103 and 107 to direct the liquid crystal panel to modulate the light such that the sign of the electric field generated in the liquid crystal layer 105 is cyclically inverted (that is, the sign cyclically changes between positive and negative). In general, the applied voltages to the electrode layers 103 and 107 are set to equalize the positive and negative potential differences generated in the liquid crystal layer 105 and to restrain so-called flicker.

The specific cycle corresponds to a cycle of one field, which is 1/120 second in the NTSC system and is 1/100 second in the PAL system. One frame image is displayed by two fields in 1/60 second or 1/50 second. However, the specific cycle may correspond to a display cycle of one frame image.

The electric field is generated by superposition of the voltages (electric fields) provided to the electrode layers 103 and 107, voltage drops due to the resistances of the alignment films 104 and 106, and the minute voltages (electric fields) produced by electric charges (electric charges of electrons and holes) trapped by each alignment film.

Figure 3:
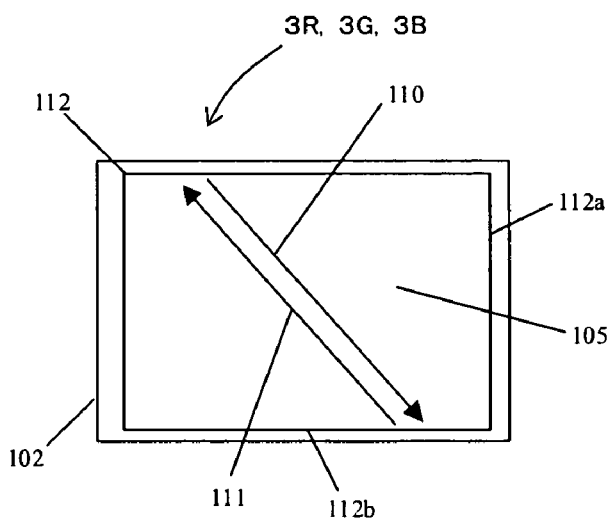
FIG. 3 shows a pretilt direction in the liquid crystal panel in the above vertical alignment mode.

FIG. 3 shows the liquid crystal panels viewed from the glass substrate 102. Reference numeral 110 denotes a direction of director orientation (pretilt direction) as a direction along which liquid crystal molecules are aligned by the first alignment film 104. Reference numeral 111 denotes a direction of director orientation (pretilt direction) as a direction along which the liquid crystal molecules are aligned by the second alignment film 106. Reference numeral 112 denotes an effective display area of the liquid crystal panel. The directions of director orientation 110 and 111 are both tilted by a few degrees with respect to the normal line of the alignment film surface and tilted in directions opposite to each other.

Reference numeral 112 denotes the effective display area that comprises all the pixels in the liquid crystal panel. An alignment processing is performed on each alignment film in a direction of about 45 degrees with respect to a short side 112a and a long side 112b of the effective display area 112.

In the projector, light with a high intensity emitted from a lamp increases the temperature of the liquid crystal panels 3R, 3G, and 3B. The liquid crystal panels 3R, 3G, and 3B are controlled to have a temperature of about 40 degrees C. under a normal temperature operation environment. The use of the projector for a long time, however, causes the liquid crystal panels 3R, 3G, and 3B to be in a temperature rising state (high temperature state) for a long period. When this is combined with the drive of the liquid crystal molecules for image display, a disadvantage described below is caused.

Figure 4:
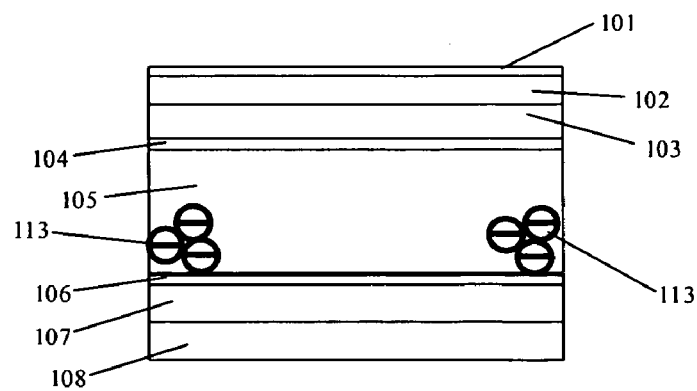
FIG. 4 is a sectional view showing charged particles that have accumulated in the liquid crystal panel.
Figure 5:
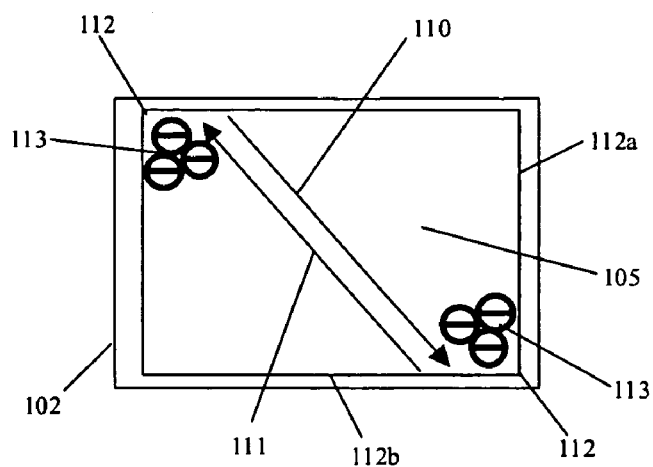
FIG. 5 shows the charged particles that have accumulated in the liquid crystal panel viewed from a glass substrate side.

FIG. 4 is a sectional view showing the liquid crystal panel. FIG. 5 shows the liquid crystal panel viewed from the glass substrate 102. As shown in FIGS. 4 and 5, charged particles 113 exist in the liquid crystal layer 105, in a seal material which is formed of an organic substance and is disposed in the vicinity of the liquid crystal layer 105, and in the vicinity of interfaces between the liquid crystal layer 105 and the first and second alignment films 104, 106 and between the first and second alignment films 104, 106 and the electrode layers 103, 107. The charged particles 113 proceed, during long-time use, along the interface between the liquid crystal layer 105 and the second alignment film 106 disposed on the side of the reflective pixel electrode layer 107 in the direction of the director orientation of the liquid crystal molecules (a first direction), and then accumulate in diagonal areas in the effective display area 112 on the side of the second alignment film 106. In this case, the charged particles 113 have charges with a negative sign.

Then, the charged particles 113 that have accumulated at the interface between the liquid crystal layer 105 and the second alignment film 106 as described above change the effective electric field generated in the liquid crystal layer 105. This causes a deterioration in image quality in the area where the charged particles have accumulated.

(The First Control)

In the present invention, the liquid crystal panel driver 303 controls the voltages applied to the electrode layers 103 and 107 (performs the first control) in order to float such accumulated charged particles 113 from the interface between the liquid crystal layer 105 and the second alignment film 106 and the diagonal areas in the effective display area 112.

The first control is performed in a state where the light source 301 is turned off, and where the first and second potentials are not provided to the electrode layers 103 and 107.

Alternatively if the effective display areas on the liquid crystal panels 3R, 3G, and 3B are changed by operating the display selection switch 330, the first control is performed in a state where the first and second potentials are not provided to the electrode layers 103 and 107 in the effective display area after they are changed. In other words, it is performed before light modulation starts in the second effective light modulation area if the effective light modulation areas on the liquid crystal panels 3R, 3G, and 3B are changed from first effective modulation area to the second effective modulation area.

The effective display area is changed not only when the effective display area is changed while this projector is used, but also when the effective display area is selected while the use of this projector is initiated, which is different from that set when the use of the previous projector is terminated.

Figure 6:
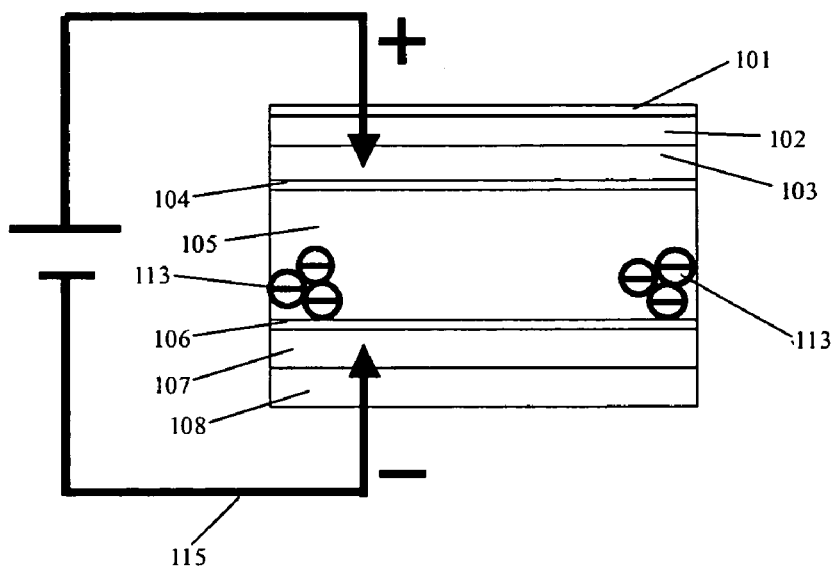
FIG. 6 shows how voltages for floating the charged particles are applied to opposite electrodes according to the first to fifth embodiments.

As shown in FIG. 6, in the first control, a positive voltage (fifth potential) is applied to the transparent electrode film 103 and a negative voltage (sixth potential) is applied to the reflective pixel electrode layer 107 in order to float the accumulated charged particles 113 in the liquid crystal layer 105.

Figure 7:
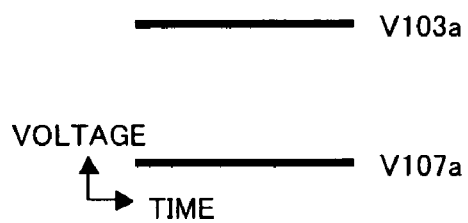
FIG. 7 shows applied voltages to the opposed electrodes shown in FIG. 6.

In the first control, FIG. 7 shows the voltages V103a and V107a applied to the electrode layers 103 and 107. The voltage (sixth potential) V107a applied to the reflective pixel electrode layer 107 is a negative voltage when compared with the voltage (third fifth potential) V103a applied to the transparent electrode film 103.

The voltages V103a and V107a applied to the electrode layers 103 and 107 are fixed direct voltages that do not change with time. The "fixed voltage" herein also includes, in addition to a voltage not changing at all, a voltage changing only within a range where voltages changed due to a variation in power supply voltage, control errors or the like can be regarded as an identical voltage. This also applies to embodiments described later.

The application of the voltages 103a and 107a generates a negative DC electric field that does not cyclically change between positive and negative in the liquid crystal layer 105.

The strength of the DC electric field applied to the liquid crystal layer 105 may change as long as the DC electric field does not cyclically change between positive and negative. Specifically, the voltages (the potential) applied to the electrode layers 103 and 107 may vary as long as the sign of the electric field caused in the liquid crystal layer 105 does not change.

The voltages applied to the transparent electrode film 103 and the reflective pixel electrode layer 107 herein described are identical (uniform) to each other in an in-plane direction of the liquid crystal layer 105. The "in-plane direction of the liquid crystal layer 105" can also be called a direction orthogonal to a thickness direction of the liquid crystal layer 105 or an in-plane direction of the display surface (or modulation surface) of the liquid crystal panel.

In this way, the liquid crystal panel driver 303 provides the first control that maintains constant (fixed to the positive or negative) the sign of the electric field generated in the liquid crystal layer 105, and provides the same potential in the in-plane direction of the liquid crystal 105 to the electrode layers 103 and 107. The difference between the voltages (the potential difference) applied to the electrode layers 103 and 107 may be a potential difference of 1.0V to 2.0V for example.

The liquid crystal panel driver 303 applies the voltages to (performs the first control on) both electrode layers 103 and 107 for a first predetermined time (e.g., for one second) while the light source 301 is turned off, or while the effective display areas on the liquid crystal panels 3R, 3G, and 3B are changed.

Figure 8:
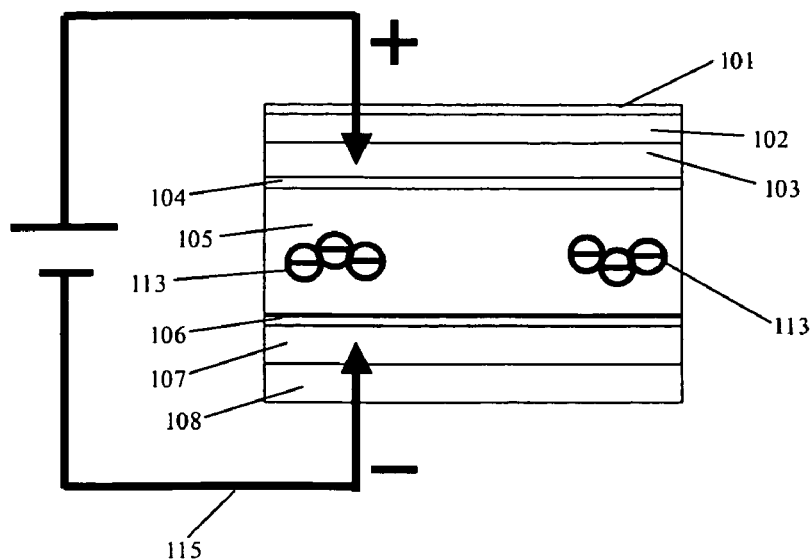
FIG. 8 shows charged particles floated by applying voltages to the opposed electrodes according to the first to fifth embodiments.

As a result, as shown in FIG. 8, the negative charged particles 113 that have attached to or accumulated at the interface between the liquid crystal layer 105 and the second alignment film 106 are dissociated from that interface by repulsion forces generated by their coulomb forces against the negative voltage applied to the reflective pixel electrode layer 107. Then, the negative charged particles 113 are floated in the liquid crystal layer 105.

The "the first predetermined time" herein means the time required for causing most (e.g., 70% or more) or all of the accumulated charged particles 113 to be dissociated from the interface between the liquid crystal layer 105 and the second alignment film 106 and thus floating them in the liquid crystal layer 105.

As described above, the voltage applied to the reflective pixel electrode layer 107 which is disposed on the side of the second alignment film 106 where the charged particles 113 accumulate at the interface between the second alignment film 106 and the liquid crystal layer 105 has the same negative sign as that of the charged particles 113.

(The Second Control)

The present invention provides (second) control over the voltages applied to both electrode layers 103 and 107 so as to attract and diffuse (move) the charged particles 113 in the diagonal direction (the second direction) which is different from the diagonal direction (the first direction) in which the charged particles 113 have accumulated.

The second control is also performed while the light source 301 is turned off, or before the light modulation is initiated in the second effective light modulation area if the effective light modulation area on the liquid crystal panels 3R, 3G, and 3B is changed from the first effective light modulation area to the second effective light modulation area.

Specifically, voltages are applied to the transparent electrode film 103 and the reflective pixel electrode layer 107 such that the difference between the voltages applied thereto (hereinafter referred to as an the potential difference between the electrodes) has an uneven distribution in the in-plane direction of the liquid crystal layer 105, and the distribution generates an electric field. Specifically the voltages applied to the transparent electrode film 103 and the reflective pixel electrode layer 107 are controlled such that the charged particles accumulated in the first diagonal direction are diffused in the second diagonal direction. In other words, the liquid crystal panel driver 303 performs the second control that maintains constant the sign of the electrical field generated in the liquid crystal layer 105 and provides the third and fourth electrical potentials to the transparent electrode film 103 and the reflective pixel electrode layer 107. The difference therein between the third and fourth potentials changes in the in-plane direction of the liquid crystal layers 105. This applied voltage control (second control) lasts for a second predetermined time.

Figure 9:
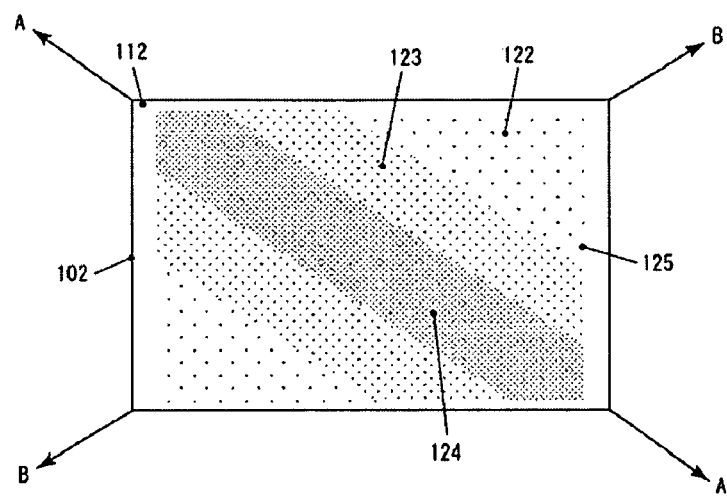
FIG. 9 shows a voltage in-plane distribution applied to a reflective pixel electrode layer for diffusing the charged particles that have accumulated according to the first to fifth embodiments.

FIG. 9 shows a distribution in the effective display area 112 of the voltage (a third voltage) applied to the reflective pixel electrode layer 107 in the second control. Three areas 124, 123, and 122 and aligned with the diagonal direction B, and become more distant from the diagonal line A in this order. The second control is directed to an operation that applies a higher voltage as the distance increases. The application time that is the second predetermined time is identical in all of the areas.

In FIG. 9, an area 122 that receives a high applied voltage is shown with a light tone (in a white color), an area 123 that receives a low voltage is shown with a proportionally-darker tone (in gray), and an area 124 that receives no voltage is shown in black. Reference numeral 125 denotes the pixel effective area of the reflective pixel electrode layer 107 which corresponds to the effective display area 112.

As can be seen from FIG. 9, the potential difference between the electrodes becomes constant in the diagonal direction (a direction parallel to the pretilt directions 110 and 111 of the liquid crystal particles, in other words the first direction) A along which the charged particles 113 are accumulated and the potential difference between the electrodes is 0 on the diagonal line to the diagonal direction A and the area 124 in the vicinity of the diagonal line. On the other hand, the potential difference between the electrodes changes significantly in the other diagonal direction B (the second direction) being different from the diagonal direction A so that the potential difference between the electrodes is changed closer to the edge of the panel.

As can be seen from FIG. 9, the potential difference between the electrodes is fixed in one diagonal direction A (a direction parallel to the pretilt directions 110 and 11 of the liquid crystal particles, thus the first direction) along which the charged particles 113 accumulate, and the potential difference between the electrodes is 0 on the diagonal line in the diagonal direction A and in the area 124 at the vicinity of the diagonal line. On the other hand, the potential difference between the electrodes is changed in the other diagonal direction B (the second direction) being different from the diagonal direction A such that it is larger closer to the edges of the panels.

The area 122 is an area where the largest number of charged particles 113 accumulate, corresponding to a first area. The areas 123 and 124 correspond to a second area with respect to the area 122. Further, the area between the areas 123 and 124 corresponds to the first or second accumulated areas.

Figure 11:
FIG. 11 shows a voltage applied to one area in the liquid crystal panel according to the first embodiment.
Figure 12:
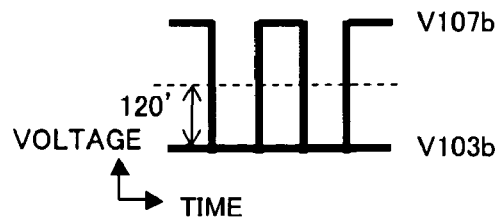
FIG. 12 shows a voltage applied to another area in the liquid crystal panel according to the first embodiment.
Figure 13:
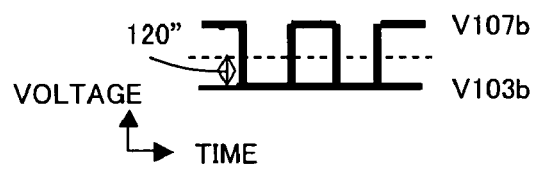
FIG. 13 shows a voltage applied to yet another area in the liquid crystal panel according to the first embodiment.

In this embodiment of the present invention, the voltages applied to the electrode layers 103 and 107 (third and fourth potentials) are set as shown in FIGS. 11 to 13.

FIG. 11 shows the voltage applied in the area 124 shown in FIG. 9. The voltage (the third potential) V103b applied to the transparent electrode film 103 and the voltage (the fourth potential) V107b applied to the reflective pixel electrode layer 107 are fixed direct voltages that do not change with time. The applied voltages V103b and V107b are identical to each other, so that the potential difference between the electrodes is 0.

The term "identical to each other" refers not only to a case where the applied voltages are completely identical to each other, but also to a case where the applied voltages have a difference due to control errors or the like within a range where the applied voltages can be regarded as being identical to each other. This is also applied to embodiments described later.

FIG. 12 shows the voltage applied in the area 122 shown in FIG. 9. The voltage (the fourth potential) V107b applied to the reflective pixel electrode layer 107 is an alternating voltage that has the minimum value identical to that of the voltage (the third potential) V103b applied to the transparent electrode film 103. The voltage V103b applied to the transparent electrode film 103 is a direct voltage. Such control of the applied voltage is equivalent to applying, to the reflective pixel electrode layer 107, a positive direct voltage corresponding to a time-integral value (shown by a dotted line in FIG. 12) of the alternating voltage V107b applied to the reflective pixel electrode layer 107.

FIG. 13 shows the voltage applied in the area 123 shown in FIG. 9. As in the area 122, the voltage (the fourth potential) V107b applied to the reflective pixel electrode layer 107 is an alternating voltage that has the minimum value identical to the voltage (the third potential) V103b applied to the transparent electrode film 103. The voltage V103b applied to the transparent electrode film 103 is a direct voltage. However, the alternating voltage applied to the reflective pixel electrode layer 107 has the maximum value that is lower than the maximum value of the alternating voltage applied to the reflective pixel electrode layer 107 in the area 122.

Such control of the applied voltage is equivalent to applying, to the reflective pixel electrode layer 107, a positive direct voltage corresponding to the time-integral value (shown by the dotted line in FIG. 13) of the alternating voltage V107b applied to the reflective pixel electrode layer 107.

As a result, the potential difference between the electrodes 120 larger than that provided to the area 123 is provided to the area 122. Thus, a higher direct voltage is applied to the area 122.

The liquid crystal projector according to this embodiment is set such that the potential difference between the electrodes along with the diagonal direction (the second direction) B is 2V at maximum on the panel edge. The frequency of the AC applied to the pixel electrode layer 107 is 120 Hz in the NTSC method and 100 Hz in the PAL method. The time in which the voltage is applied or the second predetermined time is a time period required for most (e.g., 70%) or all of the charged particles 113 that have accumulated in the diagonal direction A (the first direction) to diffuse in the orthogonal direction B (the second direction), and may be one second for example.

Figure 14:
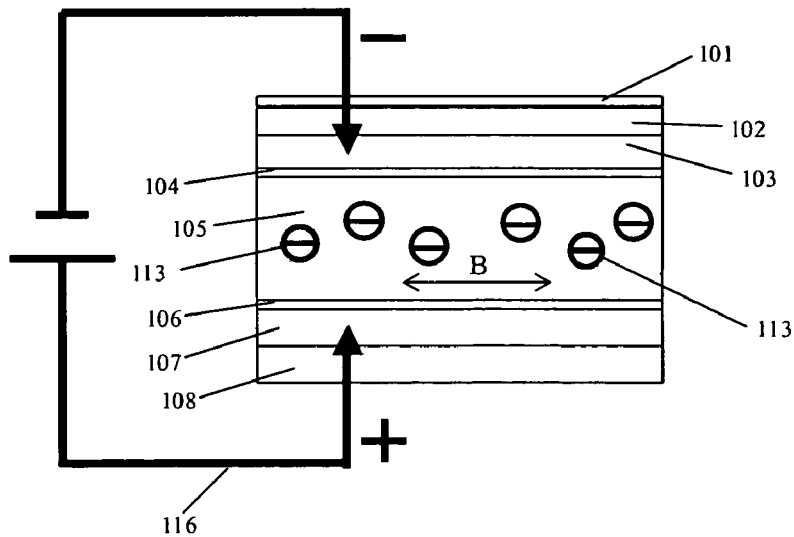
FIG. 14 shows how the applied voltages are applied to the opposed electrodes for diffusing the charged particles according to the first to fifth embodiments.

FIG. 14 shows a section of the structure of the liquid crystal panel. In this figure, the signs of the voltages applied to the liquid crystal layer 105 in the areas 122 and 123 other than the area 124 in which the voltage of 0 is applied to the liquid crystal layer 105. As described above, the voltage V107b applied to the reflective pixel electrode layer 107 is a positive voltage with respect to the voltage V103b applied to the transparent electrode film 103, so that a positive DC electric field is generated in the liquid crystal layer 105.

The voltage applied to the reflective pixel electrode layer 107, which is disposed on the side of the second alignment film 106 where the charged particles 113 accumulate at the interface between the second alignment film 106 and the liquid crystal layer 105, has a positive sign different from that of the charged particles 113. The voltage V107b applied to the reflective pixel electrode layer 107 also increases toward the diagonal areas in the diagonal direction B different from the diagonal direction A along which the charged particles 113 accumulate.

Figure 15:
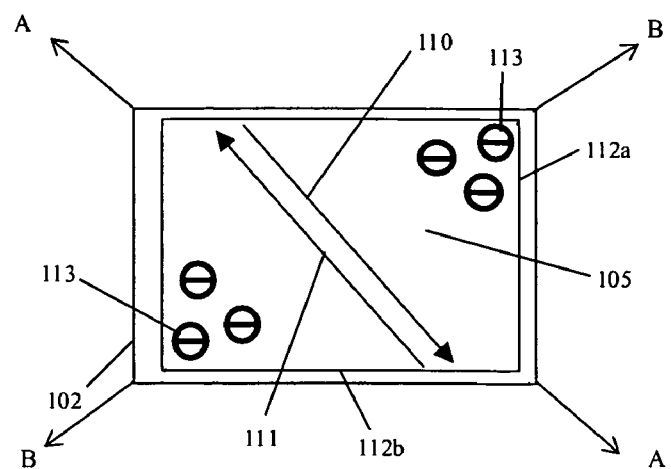
FIG. 15 shows how accumulated charged particles diffuse.

Therefore, as shown in FIG. 15, the negative charged particles 113 that have accumulated at the interface between the second alignment film 106 and the liquid crystal layer 105 in the diagonal direction A are drawn by their coulomb forces in the diagonal direction B to be diffused in the liquid crystal layer 105.

Thus, the second control subsequently to the first control can float the charged electric particles 113 that have accumulated in the diagonal direction A in the liquid crystal layer 105 and then diffuse them in the diagonal direction B. Accordingly, this control can suppress the image deterioration caused by the accumulated charged particles 113.

Although this embodiment has described the case where the negative charged particles 113 that have accumulated at the interface between the liquid crystal layer 105 and the second alignment film 106 are dissociated from that interface, positive charged particles may accumulate at the interface between the liquid crystal layer 105 and the first alignment film 104. The control of the applied voltage similar to the above described control can cause the positive charged particles to be dissociated from the interface to float them in the liquid crystal layer 105, and diffuse the charged particles accumulated along a specific direction in another direction. In this case, the voltage applied to the transparent electrode film 103 which is disposed on the side of the first alignment film 104 where the positive charged particles accumulate at the interface between the first alignment film 104 and the liquid crystal layer 105 may have the same positive sign as that of the charged particles.

(The Liquid Crystal Panel Driver)

Figure 19:
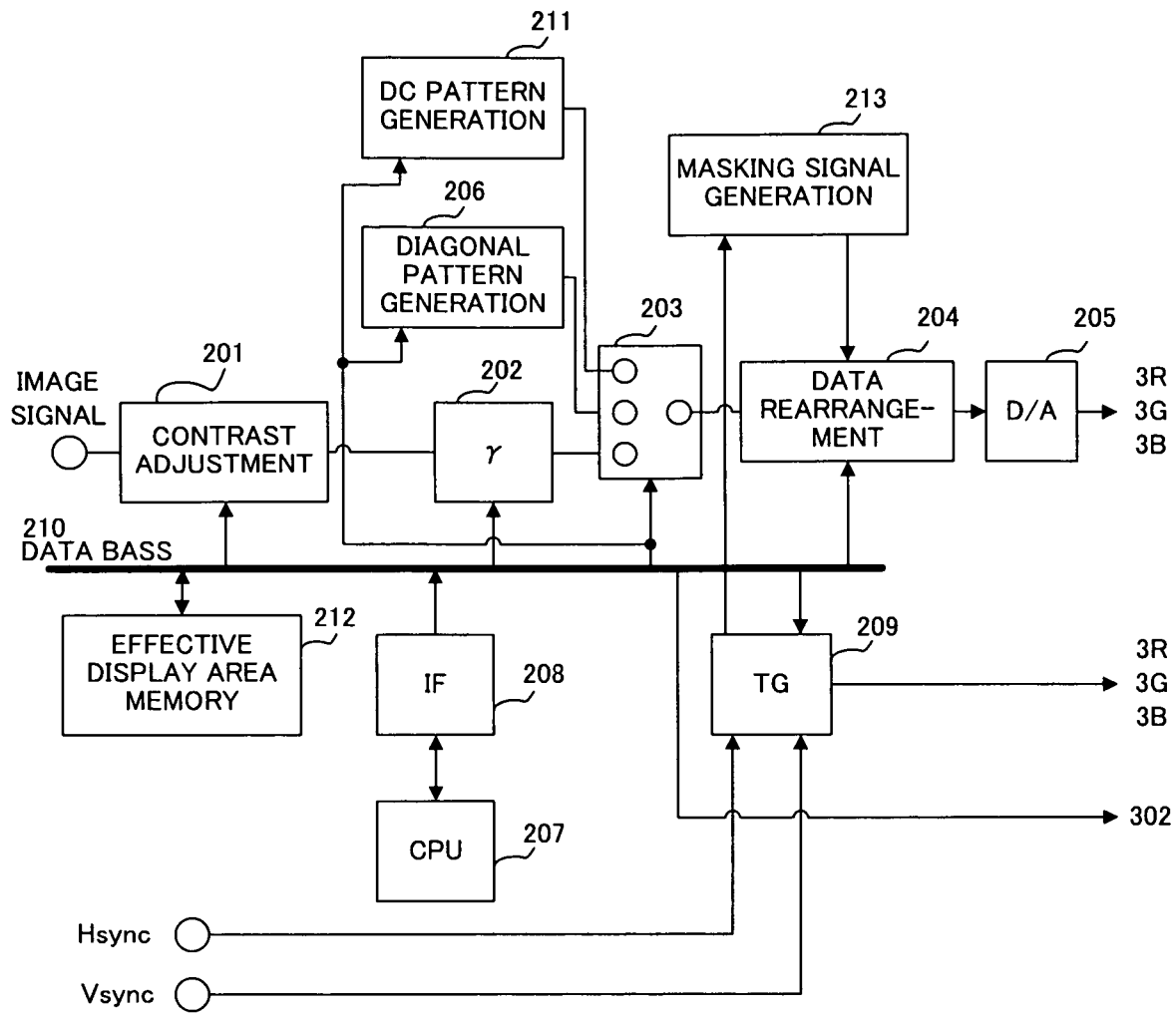
FIG. 19 shows a configuration of a liquid crystal panel driver according to the first to fifth embodiments.

FIG. 19 is a block diagram showing an internal configuration of the liquid crystal panel driver 303 shown in FIG. 1. A contrast adjustment circuit 201 adjusts the contrast of an image signal that is input to the liquid crystal panel driver 303. A gamma correction circuit 202 corrects the image signal whose contrast has been adjusted, according to the applied voltages of the liquid crystal panels 3R, 3G, an 3B—the reflectance (or the transmittance) characteristics. The output signal on the gamma correction circuit 202 is input to a data rearrangement circuit 204 via a selector 203. The data rearrangement circuit 204 rearranges the data configured to be displayed on the liquid crystal panels 3R, 3G, and 3B.

The output of the data rearrangement circuit 204 is input to the liquid crystal panels 3R, 3G, and 3B after it is converted to the analog signal by a DA converter.

A horizontal synchronization signal ("Hsync") and a vertical synchronization signal ("Vsync") are input to a timing signal generation circuit ("TG") 209 in the liquid crystal panel driver 303. The TG 209 generates the signal required to drive the liquid crystal panels 3R, 3G, and 3B based on Hsync and Vsync.

A central processing unit circuit ("CPU") 207 sets a variety of parameters to respective circuits in the liquid crystal panel driver 303. The output of the CPU 207 is converted by the interface circuit 208 into an appropriate format that is suitable for reading each circuit, and is input to the contrast adjustment circuit 201, the gamma correction circuit 202, the data rearrangement circuit 204, and the TG 209 via a data bus 210.

A DC pattern generation circuit 211 outputs an applied voltage pattern (a uniform pattern) corresponding to the applied DC field in order to perform the first control that floats the charged particles shown in FIGS. 6 and 7. In changing the efficient display area on the liquid crystal panel, the DC pattern generation circuit 211 generates the uniform pattern which corresponds to the pre-change effective display area (the first effective display area). In other words, it generates the uniform pattern that causes the same voltage to be applied to the electrode layers 103 and 107 in the in-plane direction of the liquid crystal layer 105 in the pre-change effective display area. The output from the DC pattern generation circuit 211 is input to the selector 203.

A diagonal pattern generation circuit 206 outputs the applied voltage pattern (the diagonal pattern), which corresponds to the applied voltage distribution for the second control that causes diffusions of the charged particles shown in FIG. 9, and FIGS. 11 to 14. In changing the effective display area on the liquid crystal panel, the diagonal pattern generation circuit 206 generates the diagonal pattern which corresponds to the pre-change effective display area (the first effective display area). In other words, the diagonal pattern is generated, which causes the difference between the applied voltages to the electrode layers 103 and 107 to change in the diagonal direction B in the pre-change effective display area (see FIG. 9). The output from the diagonal pattern generation circuit 206 is input to the selector 203.

The selector 203 selects one of the outputs of the DC pattern generation circuit 211, of the diagonal pattern generation circuit 206, or of the gamma correction circuit 202, according to the instruction from the CPU 207.

If the voltages are applied to the electrode layers 103 and 107 according to the diagonal pattern from the diagonal pattern generation circuit 206, an image whose tone changes along the diagonal direction B according to the diagonal pattern (a diagonal pattern image) is formed on each liquid crystal panel. If the voltages are applied to the electrode layers 103 and 107 according to the uniform pattern from the DC pattern generation circuit 211, an image whose tone is uniform on the full screen according to the uniform pattern is formed on each liquid crystal panel.

If the diagonal pattern image of the above is projected onto a light diffusion screen 313, an image having an unnatural pattern will be shown to the observer. The light source 301 is controlled to prevent this unnatural image from being shown to the observer.

(The Effective Display Area)

Figure 23A:
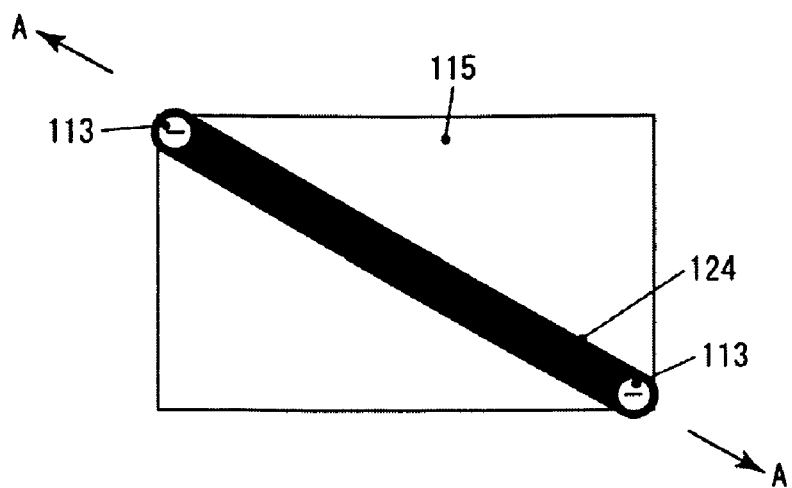
FIG. 23A shows a relationship between a first effective display area and a diagonal pattern in the liquid crystal panel.
Figure 23B:
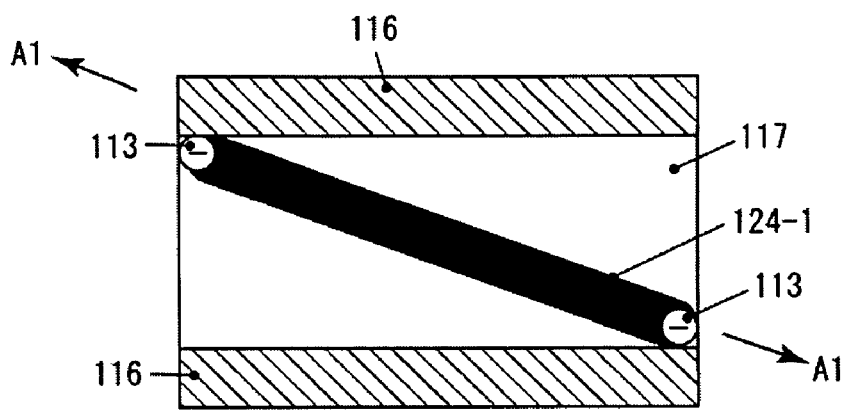
FIG. 23B shows a relationship between a second effective display area and a diagonal pattern in a liquid crystal panel.
Figure 23C:
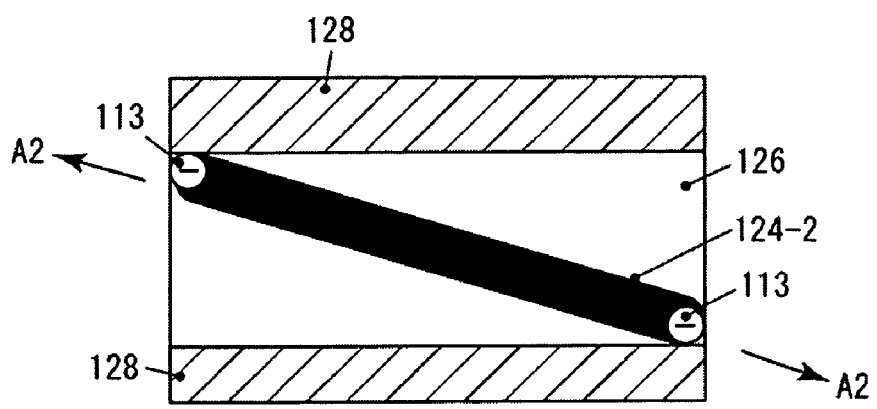
FIG. 23C shows a relationship between a third effective display area and a diagonal pattern in a liquid crystal panel.
Figure 23D:
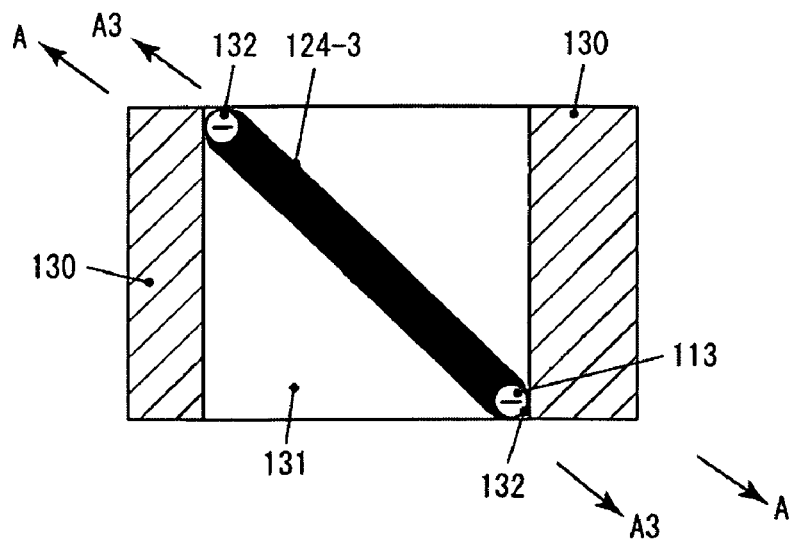
FIG. 23D shows a relationship between a fourth effective display area and a diagonal pattern in a liquid crystal panel.
Figure 23E:
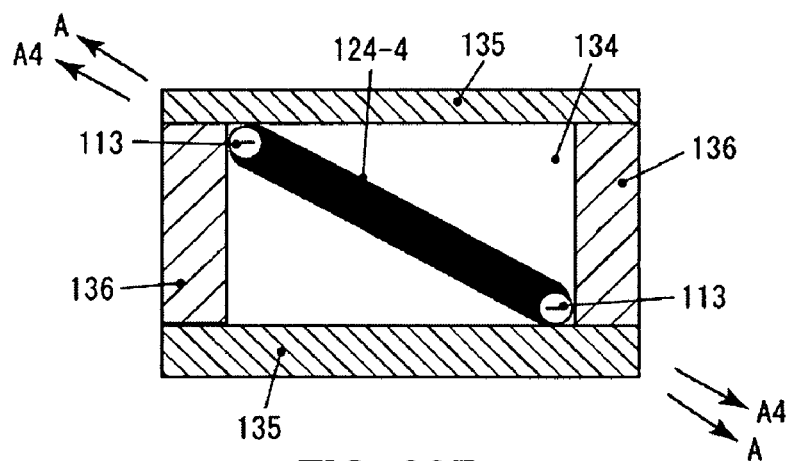
FIG. 23E shows a relationship between a first effective display area and a diagonal pattern in another liquid crystal panel.
Figure 23F:
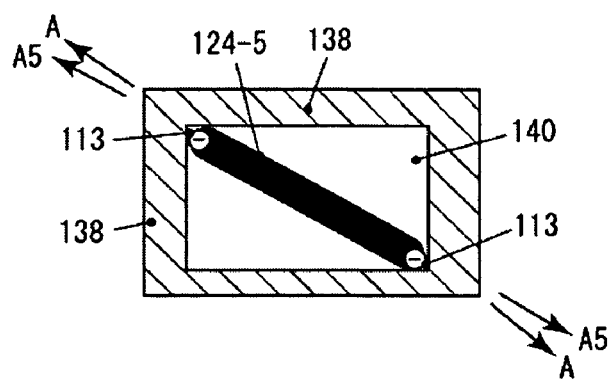
FIG. 23F shows a relationship between a second effective display area and a diagonal pattern in another liquid crystal panel.

FIGS. 23A to 23C show an effective display area when a liquid crystal panel sets the SXGA standard (1400×1050 pixels, 11.3 mm×8.5 mm). FIGS. 23D to 23F show an effective display area when a liquid crystal panel uses the FULL HD standard (1920×1080 pixels, 15.4 mm×9.6 mm).

In FIG. 23A, all pixels (1400×1050 pixels) on the liquid crystal panel are driven to display an image signal (an image for viewing) by all pixels. In this case, all pixel areas are the effective display area 115, and the charged particles 113 accumulate in the diagonal direction A of the effective display area 115. In the figure, only the area 124 in which the difference between the applied voltages to the electrode layers 103 and 107 is 0 is shown in black in the diagonal pattern (see FIG. 9) required to diffuse the charged particles 113. The diagonal pattern is set so that the difference between the applied voltages to the electrode layers 103 and 107 can change in another diagonal direction of the effective display area 115. This is similar to other examples which will be described hereinafter in FIGS. 23B to 23F.

In FIG. 23B, all pixels in a horizontal direction of the liquid crystal panel and a part of pixels (1400×788 pixels) in a perpendicular direction of the liquid crystal panel are driven so as to adjust the aspect ratio of the effective display area to the 16:9 of the HD standard. Reference numeral 116 denotes a pixel area which is not driven, and reference numeral 117 denotes an effective display area (1400×788 pixels).

In this case, the charged particles 113 accumulate in the diagonal direction A1 of the effective display area 117. In the figure, only the area 124-1 in which difference between the applied voltages to the electrode layers 103 and 107 is 0 is shown in black in the diagonal pattern required to diffuse the charged particles 113. The diagonal direction A1 in which the area 124-1 extends is different from the diagonal direction A in which the area 124 extends in FIG. 23A since the effective display area 117 is narrow in the perpendicular direction.

In FIG. 23C, all pixels (1400×1050 pixels) of the liquid crystal panel are driven and a black mask is displayed the upper and the lower areas 128. Then the effective display area 126 is 1400×788 pixels, excluding the pixels which display the black mask.

In this case, the charged particles 113 accumulate in the diagonal directions A2 of the effective display area 126. In the figure, only the area 124-2 in which the difference between the applied voltages to the electrode layers 103 and 107 is 0 is shown in black in the diagonal pattern required to diffuse the charged particles 113. The diagonal direction A2 in which the area 124-2 extends is different from the diagonal directions A and A1 in which the areas 124 and 124-1 extend in FIGS. 23A and 23B since the effective display area 126 is narrow in the perpendicular direction.

In FIG. 23D, all pixels (1920×1080 pixels) of the liquid crystal panel are driven and a black mask is displayed on the left and right areas 130 so as to adjust the aspect ratio of the effective display area to 4:3. The effective display area 131 in this case has 1440×1080 pixels, excluding the pixels which display the black mask.

In this case, the charged particles 113 accumulate in the diagonal directions A3 of the effective display area 131. In the figure, only the area 124-3 in which the difference between the applied voltages to the electrode layers 103 and 107 is 0 is shown in black in the diagonal pattern required to diffuse the charged particles 113. The diagonal direction A3 in which the area 124-3 extends is different from the diagonal direction A in which the area 124 that uses all pixel areas for the effective display area (see FIG. 9) extends in FIGS. 23A and 23B since the effective display area 131 is narrow in the horizontal direction.

In FIG. 23E, all pixels in the horizontal direction of the liquid crystal panel are driven and a black mask is displayed on the right and left areas 136. Reference numeral 135 denotes a pixel area that is not driven. The effective display area 134 in this case has 1440×810 pixels.

In this case, the charged particles 113 accumulate in the diagonal directions A4 of the effective display area 134. In the figure, only the area 124-4 in which the difference between the applied voltages to the electrode layers 103 and 107 is 0 is shown in black in the diagonal pattern required to diffuse the charged particles 113. The diagonal direction A4 in which the area 124-4 extends is different from the diagonal directions A and A3 in which the areas 124 that uses all pixel areas for the effective display area (see FIG. 9) and 124-3 extend in FIG. 23D since the effective display area 134 is wide in the horizontal direction and narrow in the perpendicular direction.

In FIG. 23F, all pixels of the liquid crystal panel are driven, and a black mask is displayed on the top, bottom, right, and left areas 138. Then the effective display area 140 in this case has 1440×810 pixels equal to those in FIG. 23E. However, the effective display area 140 is located lower than the effective display area 134 in FIG. 23E.

In this case, the charged particles 113 accumulate in the diagonal directions A5 of the effective display area 140. In the figure, only the area 124-5 in which the difference between the applied voltages to the electrode layers 103 and 107 is 0 is shown in black in the diagonal pattern required to diffuse the charged particles 113. The diagonal direction A5 in which the area 124-5 extends is substantially equal to the diagonal direction A4 in FIG. 23E. However, the area 124-5 is placed lower than the area 124-4 in FIG. 23E since the effective display area 140 is located lower than the effective display area in FIG. 23E.

An effective display area on the liquid crystal panel can be selected from the effective display areas in FIGS. 23A to 23C or FIGS. 23D to 23F, according to the operation of the display area selection switch 330. The DC pattern generation circuit 211 and the diagonal pattern generation circuit 206 generate the uniform pattern or the diagonal pattern according to the position or the size of the effective display area, or according to the display area.

Although the effective display areas in FIGS. 23A to 23F are merely typical examples, effective display areas other than the above examples may be selected by changing the non-driving pixel area or by changing the size or the position of the black mask. The uniform or a diagonal pattern may be generated (or selected) depending on the position or the size of the effective display area.

Figure 24:
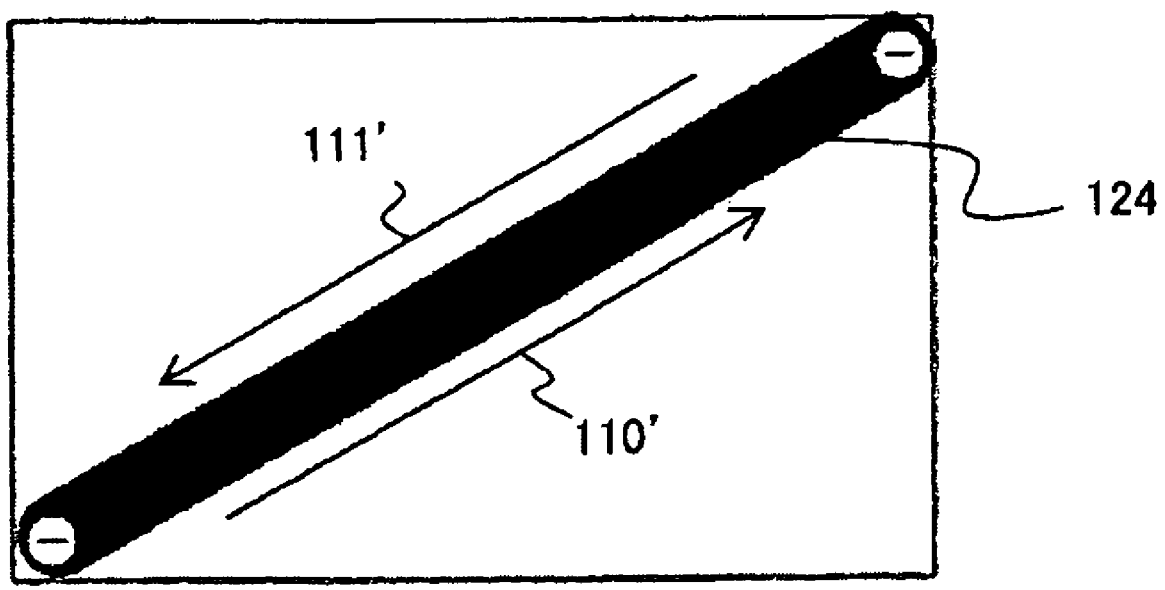
FIG. 24 shows a relationship between alignment directions and a diagonal pattern in a liquid crystal panel.

If the director orientations (pretilt directions) 110 and 111 of the liquid crystal particles, as shown in FIG. 24, invert in the right and left directions to the director orientations shown in FIG. 3, the diagonal pattern required to diffuse the charged particles 113 also inverts in the right and left directions. In FIG. 24, only the area 124 in which difference between the applied voltages to the electrode layers 103 and 107 is 0 is shown in black.

Referring back to FIG. 19, a effective display area memory circuit 212 stores the data on the positions and the sizes of the effective display areas of the liquid crystal panels 3R, 3G, and 3B (hereinafter referred to as "effective display area data"). The effective display area memory circuit 212 outputs the effective display area data stored at that point to the TG209 via the data bus 210, according to the command signal from the CPU 207.

A mask signal generation circuit 213 generates the mask signal which shows the area forming the black mask in all the pixel areas of the liquid crystal panels 3R, 3G, and 3B based on the signal from the TG209, and outputs it to the data rearrangement circuit 204. The data rearrangement circuit 204 sets the black mask in the area designated by the mask signal on the data rearrangement previously described.

A description will now be given of specific procedures of the first and second controls described above as embodiments of the present invention.

Example 1

This embodiment is an illustration that provides the first and second controls when the light source is turned off.

Figure 20:
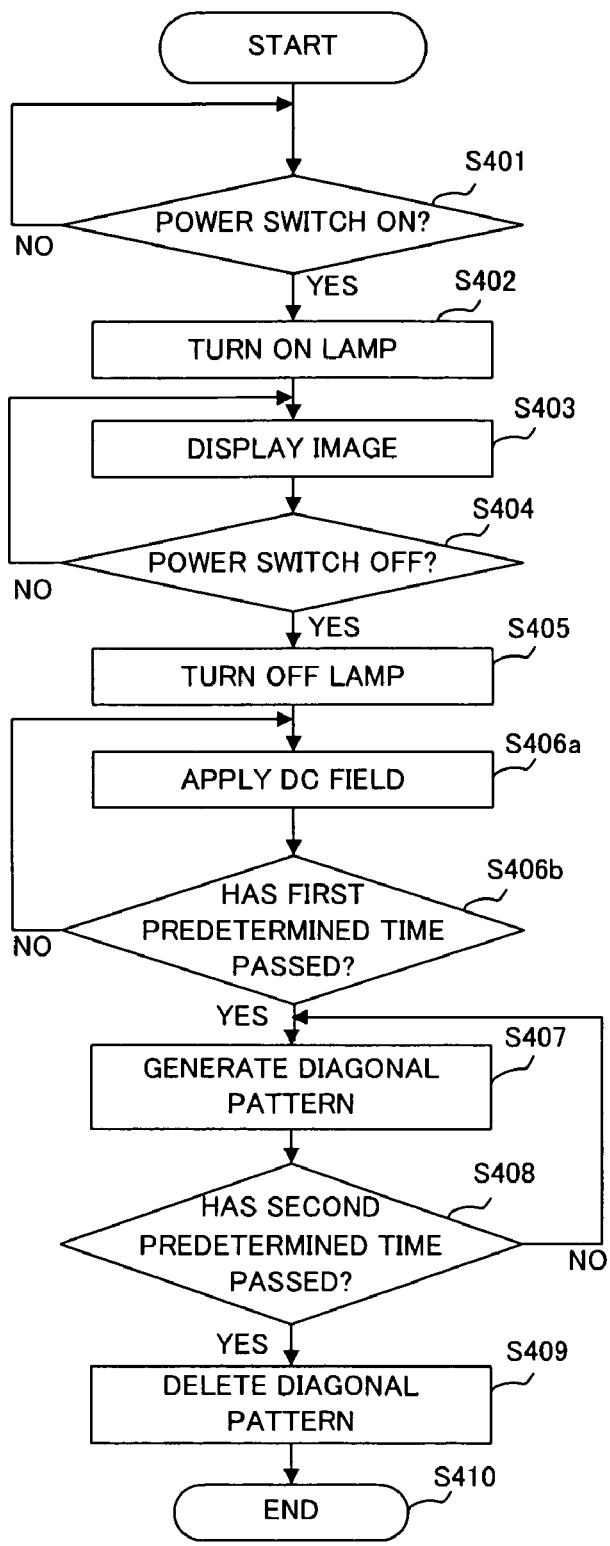
FIG. 20 is a flow chart which describes how the liquid crystal projector according to the first and second embodiments operates.

The CPU 207 provides ON/OFF control of supplying power to the light source 301 and liquid crystal panels 3R, 3G, and 3B, and the applied voltage to the liquid crystal panels 3R, 3G, and 3B according to a flow chart shown in FIG. 20.

In the step 401 of FIG. 20, the CPU 207 determines whether or not a power switch 320 is turned on (power ON). The above step is repeated if the power switch 320 is not turned on, and the flow proceeds to the step 402 if the power switch 320 is turned on.

In the step 402, the CPU 207 outputs the light source turning-on command signal to the power controller 302 according to the ON operation of the power switch 320. The power controller 302 starts supplying a power to light source (the lamp) 301, and turns on the light source 301.

Next, in the step 403, the CPU 207 outputs the panel driving command signal to the power controller 302, and starts supplying the power to the liquid crystal panels 3R, 3G, and 3B. The CPU 207 also directs the selector 203 to select the output of the gamma correction circuit 202. This will start the light modulation by the liquid crystal panels 3R, 3G, and 3B, and a image normally displayed follows.

In the step 404, the CPU 207 determines whether or not a power switch 320 is turned off (shut off operation). The flow chart goes back to the step 403 to continue displaying the image if the power switch 320 is not turned off. On the other hand, the flow chart proceeds to the step 405 if the power switch 320 is turned off.

In the step 405, the CPU 207 outputs the light source turning-off command signals to the power controller 302 according to the off-operation of the power switch 320. The power controller 302 which receives the light source turnig-off command signal stops supplying the power to the light source 301, and turns off the light source 301.

Next, in the step 406a, the CPU 207 directs the selector 203 to select the output of the DC pattern generation circuit 211, and applies the potentials (the fifth and sixth electrical potentials) to the electrode layers 103 and 107 according to the uniform pattern that is output from the DC pattern. As a result, the first control (application of DC electric field) starts in order to float in the liquid crystals layer 105 the charged particles that have accumulated in the liquid crystal layer 105. The CPU 207 starts measuring the first predetermined time.

In the step 406b, the CPU 207 determines whether or not the first predetermined time has passed. If the first predetermined time has not yet passed, the flow goes back to the step 406a. On the other hand, if the first predetermined time has passed, the flow proceeds to the step 407.

In the step 407, the CPU 207 directs the selector 203 to select the output of the diagonal pattern generation circuit 206, and applies the potentials (the third and fourth electrical potentials) according to the diagonal pattern that is output from the diagonal pattern generation circuit 206 to the electrode layers 103 and 107. As a result, the second control starts in order to diffuse the charged particles in the liquid crystal layer 105. The CPU 207 also starts measuring the second predetermined time.

In the step 408, the CPU 207 determines whether or not the second predetermined time has passed. If the second predetermined time has not yet passed, the flow goes back to the step 407. On the other hand, if the second predetermined time has passed, the flow proceeds to the step 409.

In the step 409, the CPU 207 stops (deletes) the output form the diagonal pattern generation circuit 206. Then in the step 410, the CPU 207 outputs the panel stops command signal to the power controller 302, and stops supplying the power to the liquid crystal panels 3R, 3G, and 3B. This terminates the power off control of the projector.

In this way, the embodiment first turns off the light source 301 in response to the off-operation of the power switch 320. Then, the charged particles that have accumulated at the interface between the liquid crystal layer and the alignment film are forcibly dissociated from that interface to sequentially perform the first and second control in order to diffuse them in the liquid crystal layer. This can dissolve the display brightness degradation due to the accumulation of the charged particles while preventing the unnatural image from being shown to the observer. In other words, this can suppress the image deterioration caused by the accumulated charged particles 113.

This embodiment describes the case that the first control prior to the second control after the light source 301 is turned off. However, the diagonal pattern image as in the second control does not appear during the first control, and only the uniform image appears. For this reason, the first control may be also performed before the light source 301 is turned off, or while it is in the transition from the on-state to the off-state.

Although FIG. 19 shows the example that provides the CPU 207 in the liquid crystal panel driver 303, the CPU may be provided outside the liquid crystal panel driver so that the CPU can control the liquid crystal panel driver or the power controller.

Example 2

Next, the second embodiment of the present invention will be described. Those elements in this embodiment, which are the corresponding or similar elements in the first embodiment, will be designated by the same reference numerals as the first embodiment.

In this embodiment similarly to the first embodiment, the first control maintains constant the sign in the electric field generated in the liquid crystal layer 105 and provides the third and fourth potentials that are equal in the in-plane direction of the liquid crystal layer 105 to the electrode layers 103 and 107, when the light source 301 is turned off. Then, the second control that has the fixed sign in the electric field generated in the liquid crystal layer 105 and provides the third and fourth potentials whose difference changes in the in-plane direction of the liquid crystal layer 105 to the electrode layers 103 and 107. Specifically the control flowchart is similar to that of the first embodiment shown in FIG. 20.

However, this embodiment is different from the first embodiment in that the DC voltage is applied to the reflective pixel electrode layers 107 in the second control.

Figure 16:
FIG. 16 shows a voltage applied to one area in the liquid crystal panel according to the second embodiment.
Figure 17:
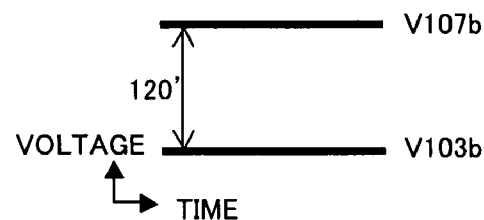
FIG. 17 shows a voltage applied to another area in the liquid crystal panel according to the second embodiment.
Figure 18:
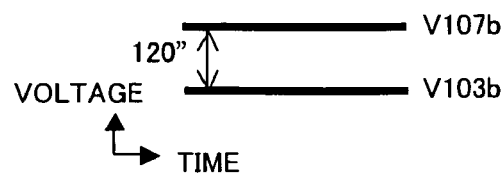
FIG. 18 shows a voltage applied to yet another area in the liquid crystal panel according to the second embodiment.

Voltages (the third and fourth potentials) in the second control of the prevention is the embodiment applied to the transparent electrode film 103 and the reflective pixel electrode 107 are shown in FIGS. 16, 17, and 18.

FIG. 16 shows the voltage applied in the area 124 shown in FIG. 9. The voltage V103b applied to the transparent electrode film 103 and the voltage V107b applied to the reflective pixel electrode layer 107 are fixed direct voltages that do not change with time. The applied voltages V103b and V107b are identical to each other, so that the interelectrode potential difference is 0.

FIG. 17 shows the voltage applied in the area 122 shown in FIG. 9. The voltage V103b applied to the transparent electrode film 103 and the voltage V107b applied to the reflective pixel electrode layer 107 are fixed direct voltages that do not change with time. The applied voltages V107b to the reflective pixel electrode layer 107 are set greater than the applied voltage V103b to the transparent electrode film 103, so that the potential difference between the electrodes is 120'.

FIG. 18 shows the voltage applied in the area 123 shown in FIG. 9. Similarly to the applied voltages in the area 122, the voltage V103b applied to the transparent electrode film 103 and the voltage V107b applied to the reflective pixel electrode layer 107 are fixed direct voltages that do not change with time. The applied voltages V107b to the reflective pixel electrode layer 107 are set greater than the applied voltage V103b to the transparent electrode film 103, so that the potential difference between the electrodes is 120". The potential difference between the electrodes 120" is smaller than the potential difference between the electrodes 120'.

As a result, the potential difference between the electrodes 120' which is larger than the potential difference between the electrodes 120″ in the area 123 is provided to the area 122, and thus the higher direct voltage is applied to the area 122.

In this way, the charged particles 113 which are accumulated in the diagonal direction A and floated by the first control can be drawn in a diagonal direction B and diffused in the liquid crystal layer 105 as shown in FIGS. 14 and 15 in the first embodiment even if the direct voltage is applied to the reflective pixel electrode layer 107 by the second control.

Since the charged particles 113 can be always drawn by the coulomb forces in the diagonal direction B for the predetermined time in this embodiment and thus the effect to diffuse the charged particles 113 can be improved when compared with the case described in the first embodiment in which the the applied voltage V107*b* to the reflective pixel electrode layer is the alternating voltage.

Example 3

Next, the third embodiment of the present invention will be described. Those elements in this embodiment, which are the corresponding or similar elements in the first embodiment, will be designated by the same reference numerals as the first embodiment.

In this embodiment similarly to the first embodiment, the first control maintains constant the sign in the electric field generated in the liquid crystal layer 105 and provides the same potentials in the in-plane direction of the liquid crystal layer 105 to the electrode layers 103 and 107 when the light source 301 is turned off. Then, the second control follows to maintain constant the sign in the electric field generated in the liquid crystal layer 105 and provides the third and fourth potentials whose difference changes in the in-plane direction of the liquid crystal layer 105 to the electrode layers 103 and 107.

However, this embodiment is different from the first embodiment in that the first and second control are performed before the light source 301 is turned on in response to the on-operation of the power switch 320.

Figure 21:
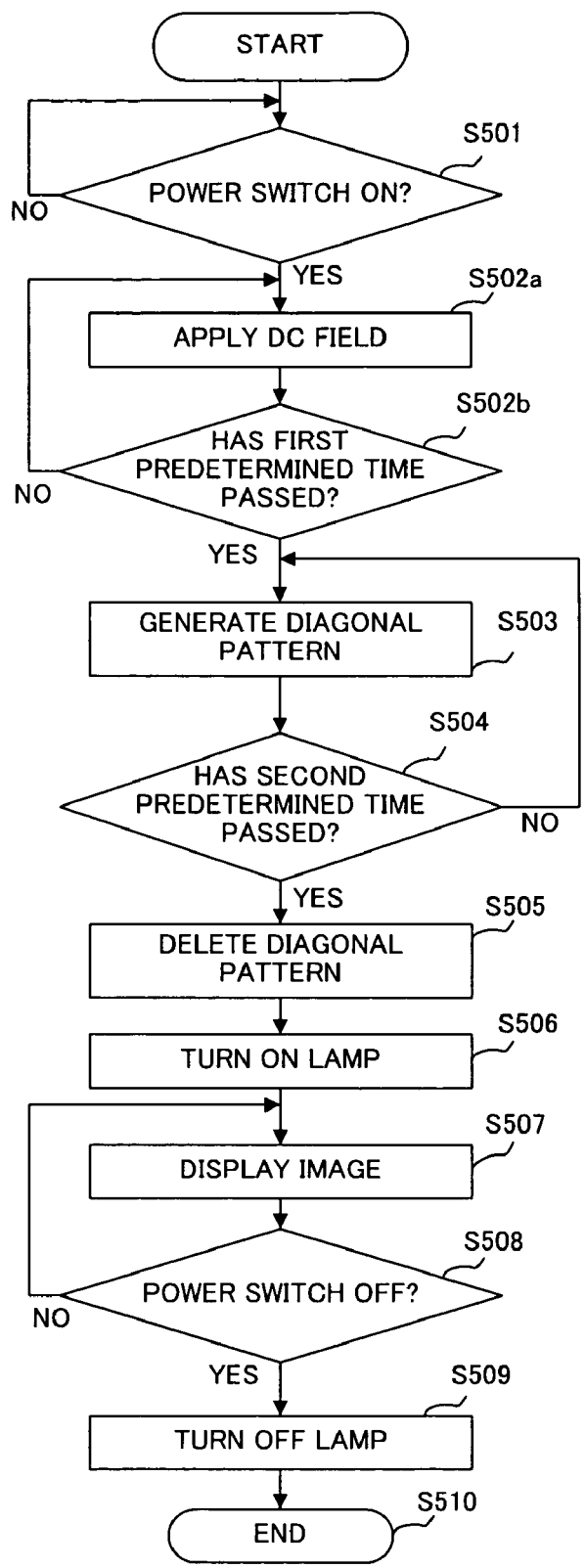
FIG. 21 is a flow chart which describes how the liquid crystal projector according to the third embodiment operates.

A flow chart in FIG. 21 describes how the CPU 207 operates in this embodiment.

In the step 501, the CPU 207 determines whether or not a power switch 320 is turned on (power ON). The above step is repeated if the power switch 320 is not turned on, and the flow proceeds to the step 502*a* if the power switch 320 is turned on.

In the step 502*a*, the CPU 207 directs the power switch 320 to output the panel drive command signal to the power controller 302 in response to the ON-operation, and starts supplying the power to the liquid crystal panels 3R, 3G, and 3B.

The CPU 207 also directs the selector 203 to select the output of the DC pattern generation circuit 211, and applies to the electrode layers 103 and 107, the potential (the fifth and sixth electrical potentials) according to the uniform pattern that is output from the direct current pattern generation circuit 211. As a result, the first control (DC field application) starts in order to float in the liquid crystal layer 105 the charged particles 113 that have accumulated. The CPU 207 starts measuring the first predetermined time.

In the step 502*b*, the CPC 207 determines whether or not the first predetermined time has passed. If the first predetermined time has not yet passed, the flowchart goes back to the step 502*a*. On the other hand, if the first predetermined time has passed, the flow chart proceeds to the step 503.

In the step 503, the CPU 207 directs the selector 203 to select the output of the diagonal pattern generation circuit 206, and applies to the electrode layers 103 and 107 the potential (the third and fourth electrical potentials) according to the diagonal pattern that is output from the diagonal pattern generation circuit 206. Then, the second control starts in order to diffuse the charged particles in the liquid crystal layer 105.

The voltage applied to the reflective pixel electrode layer 107 in this step may be the AC current voltage described in the first embodiment or the DC voltage described in the second embodiment. The CPU 207 also starts measuring the second predetermined time.

In the step 504, the CPU 207 determines whether or not the second predetermined time has passed. If the second predetermined time has not yet passed, the flowchart goes back to the step 503. On the other hand, if the second predetermined time has passed, the flow chart proceeds to the step 505. In this way, as shown in FIGS. 14 and 15 of the first embodiment, the charged particles 113 which are accumulated in the diagonal direction A and floated by due to the first control can be drawn in the diagonal direction B and diffused in the liquid crystal layer 105.

In the step 505, the CPU 207 stops (deletes) the output form the diagonal pattern generation circuit 206.

In the step 506, the CPU 207 outputs the light source turning on command signal to the power controller 302. The power controller 302 starts supplying the power to the light source 301, and turns on the light source 301. This terminates the power-on control of the projector.

Next in the step 507, the CPU 207 directs the selector 203 to select the output of the gamma correction circuit 202. This will start the light modulation by the liquid crystal panels 3R, 3G, and 3B, and an image is displayed normally.

In the step 508, the CPU 207 determines whether or not a power switch 320 is turned off (shut off). The flow chart goes back to the step 507 to continue displaying the image if the power switch 320 is not turned off. On the other hand, the flow proceeds to the step 509 if the power switch 320 is turned off.

In the step 509, the CPU 207 outputs the light source turning-off command signal to the power controller 302 according to the off-operation of the power switch 320. The power controller 302 which receives the light source turning-off command signal stops supplying the power to the light source 301, and turns off the light source 301. Then, in the step 510, the CPU 207 outputs the panel stop command signal to the power controller 302, and stops supplying the power to the liquid crystal panels 3R, 3G, and 3B. This terminates the power off control of the projector.

In this way in the embodiment, the charged particles that have accumulated at the interface between the liquid crystal layer and the alignment film due to the previous use of the projection are forcibly dissociated from that interface to sequentially perform the first and second controls in order to float them in the liquid crystal layer according to the on-operation of the power switch 320. Then the light source 301 is turned on after the first control and the second control are complete. This can dissolve the display brightness degradations caused by the accumulations of the charged particles without showing to an observer an unnatural image of a diagonal pattern that would appear in the liquid crystal panel, due to the second control that diffuses the charged particles. In other words, this can suppress the image deterioration caused by the accumulated charged particles.

Example 4

The fourth embodiment is an example that provides the first control and the second control when the effective display areas are switched.

Figure 22:
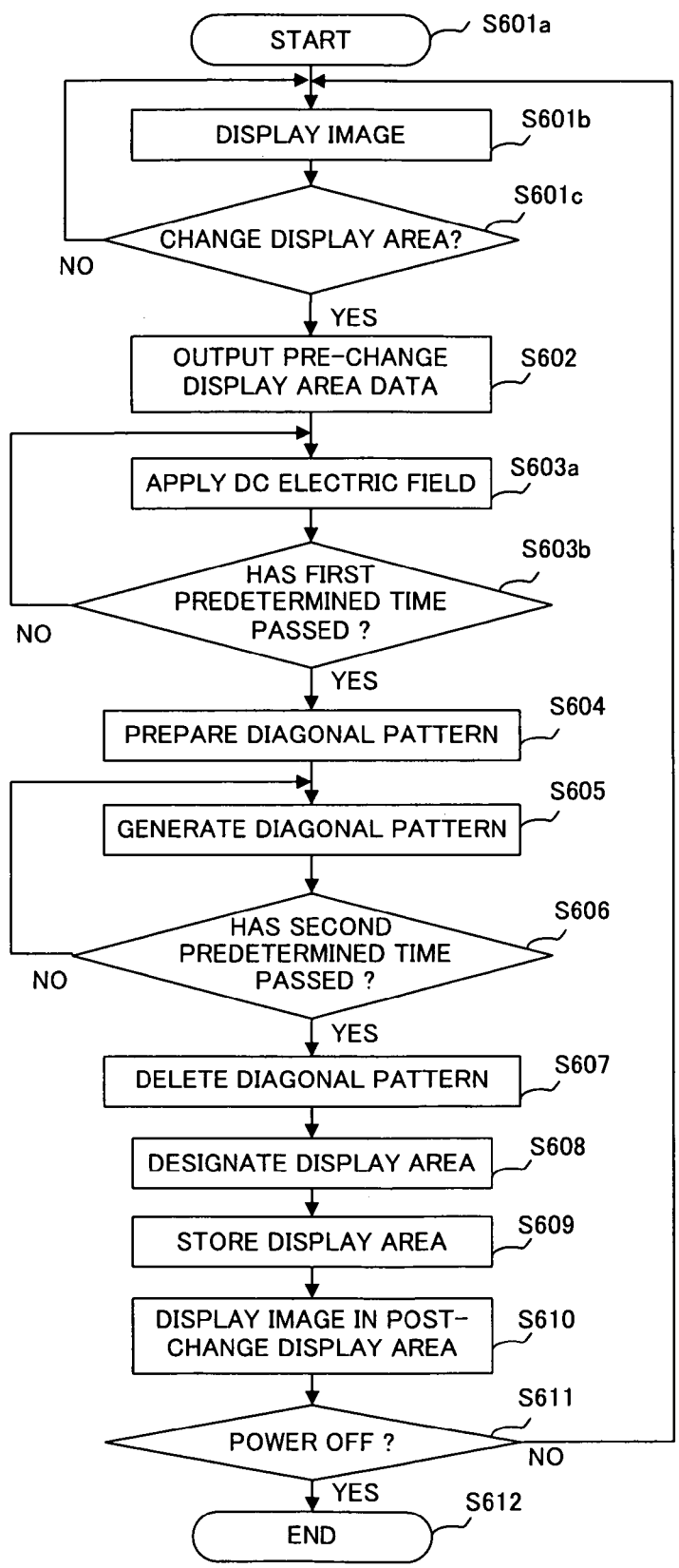
FIG. 22 is a flow chart which describes how the liquid crystal projector according to the fourth and fifth embodiments operates.

The CPU 207 provides of applied voltages to the liquid crystal panels 3R, 3G, and 3B including the first and second controls according to a flow chart shown in FIG. 22 in switching the effective display areas of the liquid crystal panels 3R, 3G, and 3B.

In the step (abbreviated as "S" in the figure) 601a of FIG. 22, the CPU 207 starts the operation in response to the ON-operation of the power switch of the projector. The CPU 207 starts supplying the power to each part of the light source (the lamp) 301 or each liquid crystal panel via the power controller 302.

Next, in the step 601b, the CPU 207 starts the display of the image that is displayed normally (the light modulation) in the effective display areas selected when the power switch is turned on of the liquid crystal panels 3R, 3G, and 3B. At this time, the CPU 207 directs the effective display area memory circuit 212 to store the effective display area data of the liquid crystal panels 3R, 3G, and 3B.

In the step 601c, the CPU 207 determines whether or not a change of the effective display area is commanded by the display area selection switch 330. The flow chart goes back to the step 601b to continue displaying an image normally if no change of the effective display area is commanded. On the other hand, the flow proceeds to the step 602 if a change of the effective display area is commanded.

In the step 602, the CPU 207 outputs to the TG209 the effective display area data which is stored in the effective display area memory circuit 212 in the step 601b and corresponds to the pre-change effective display area.

Then, in the step 603a, the CPU 207 directs the selector 203 to select the output of the DC pattern generation circuit 211, and applies to the electrode layers 103 and 107 the potential (the fifth and sixth electrical potential) according to the uniform pattern that is output from the direct current pattern generation circuit 211.

At this time, the DC pattern generation circuit 211 generates the uniform pattern corresponding to the pre-change effective display area (the first effective light modulation area) based on the signal from the TG 209 which has obtained the pre-change effective display area data in the step 602.

As a result, the first control (the DC field application) starts in order to float in the liquid crystal layer 105 the charged particles 113 that have accumulated in the liquid crystal layer 105. The CPU 207 starts measuring the first predetermined time.

In the step 603b, the CPU 207 determines whether or not the first predetermined time has passed. If the first predetermined time has not yet passed, the flow goes back to the step 603a. On the other hand, if the first predetermined time has passed, the flow proceeds to the step 604.

In the step 604, the CPU 207 directs the diagonal pattern generation circuit 206 to generate a diagonal pattern corresponding to the pre-change effective display area, based on the signals from the TG 209.

The diagonal pattern generation circuit 206 may newly generate a diagonal pattern based on every signal from the TG 209, but may also previously store a plurality of diagonal patterns corresponding to the effective display area in order to select the diagonal pattern corresponding to the pre-change effective display area.

Next, in the step 605, the CPU 207 directs the selector 203 to select the output of the diagonal pattern generation circuit 206, and applies to the electrode layers 103 and 107 the potential (the third and fourth electrical potentials) according to the diagonal pattern that is output from the diagonal pattern generation circuit 206. As a result, the second control starts that diffuses the charged particles in liquid crystal layer 105 in the pre-change effective display area. The CPU 207 also starts measuring the second predetermined time.

Here, in the step 601c, assume that a change of the effective display area, for example is commanded from the effective display area (the first effective light modulation area) shown in FIG. 23A to that (the second effective light modulation area) shown in FIG. 23B. In this case, the effective display area data which is stored in the effective display memory circuit 212 in the step 602 and corresponds to the effective display area in FIG. 23A is read out, and the DC pattern and the diagonal pattern circuits 211 and 206 respectively generate the uniform and diagonal patterns based on the effective display area data. Then the first control and the second control based on the uniform and diagonal patterns are sequentially performed.

In the step 606, the CPU 207 determines whether or not the second predetermined time has passed. If the second predetermined time has not yet passed, the flow goes back to the step 605. On the other hand, if the second predetermined time has passed, the flow proceeds to the step 607.

In the step 607, the CPU 207 stops (deletes) the output form the diagonal pattern generation circuit 206.

In the step 608, the CPU 207 designates a post-change effective display area (the second effective light modulation area) on the liquid crystal panels 3R, 3G, and 3B according to the command by the display area selection switch 330 in the step 601c. The CPU 207 also outputs the post-change effective display area data to the TG 209. If the black mask needs to be formed on the liquid crystal panels 3R, 3G, and 3B, the data for forming the black mask is output to the mask signal generation circuit 213.

In the step 609, the CPU 207 directs the effective display area memory circuit 212 to store the post-change effective display area data designated in the step 608. The stored data is used to generate the DC pattern and the diagonal pattern respectively in the direct current pattern and the diagonal pattern generation circuits 211 and 206 if the effective display area is re-changed afterwards.

Next, in the step 610, the CPU 207 also directs the selector 203 to select the output of the gamma correction circuit 202. The data rearrangement circuit 204 rearranges the data goes to display an image or modulate the light in the post-change effective display area on the liquid crystal panels 3R, 3G, and 3B based on the signals from the gamma correction circuit 202, the TG 209, and the mask signal generation circuit 213. Then the rearranged data is output to the liquid crystal panels 3R, 3G, and 3B. Then, the image is normally displayed.

In the step 611, the CPU 207 determines whether or not a power switch is turned off, and the flow goes back to the step 601b to continue displaying the image if the power switch 320 is not turned off. On the other hand, the CPU 207 stops supplying the power to each part by the power controller 302 in the step 612, and ends operation of the projector if the power switch 320 is turned off.

As described above, this embodiment provides the first and second controls by using the uniform and diagonal patterns which correspond to the pre-change effective display area, in changing an effective display area in the liquid crystal panel. Then, in the pre-change effective display area, the charged particles that have accumulated at the interface between the liquid crystal layer and the alignment film can be forcibly dissociated from that interface and diffused in the liquid crystal layer. This can dissolve the display brightness degradation in the post-change effective display area which would be caused by accumulations of the charged particles in the pre-change effective display area. In other words, this can suppress the image deterioration caused by the accumulated charged particles before the effective display area is changed.

The post-change effective display area data, which is stored in the effective display area memory circuit 212 in the step 609 of FIG. 22 is retained even if the projector operation ends in the steps 611 and 612. For this reason, the first control and the second control described above can be performed in the next use of the projector and begins to be used for the next time even if a different effective display area is selected from that at the completion of the previous use.

In other words, the step 601a directs the effective display area memory circuit 212 to output the TG209. The effective display area data corresponding to the effective display area at the completion of the previous use of the projector (the pre-change effective display area before changed) is output. Then, the selector 203 is directed to sequentially select the outputs of the DC and diagonal pattern generation circuits 211 and 206. By this, the first control and the second control are performed in the pre-change effective display area. After that, the step 601b starts displaying the image (modulating the light) in the post-change effective display area.

Even if the effective display area is thus changed while the projector is off, the display brightness degradation can be avoided in the post-change effective display area (used at this time) which would be caused by the charged particles accumulated in the pre-change effective display area (used for the previous time).

Example 5

Next, the fifth embodiment of the present invention will be described. Those elements in the fifth embodiment, which are the corresponding or similar elements in the fourth embodiment, will be designated by the same reference numerals as the fourth embodiment.

This embodiment provides similarly to the fourth embodiment, the first control that maintains constant the sign in the electric field generated in the liquid crystal layer 105 and applies to the electrode layers 103 and 107 the same potential in the in-plane direction of the liquid crystal layer 105, in changing the effective display areas of the liquid crystal panel 3R, 3G, and 3B. Then, the second control follows which maintains constant the sign in the electric field generated in the liquid crystal layer 105 and applies to the electrode layers 103 and 17 the third and fourth potentials whose difference changes in the in-plane direction of the liquid crystal layer 105. Further the first control and the second control are performed so that they correspond to the effective display area before changed.

However, this embodiment is different from the fourth embodiment in that the DC voltage is applied to the reflective pixel electrode layers 107 in the second control. The control flow is identical to the one shown in FIG. 22 at the fourth embodiment, and the applied voltage is identical to one at the second embodiment.

This embodiment always draws the charged particles 113 by the coulomb forces in the diagonal direction B and improves the diffusion effect of the charged particles 11, when compared with the fourth embodiment that applies the voltage V107b to the reflective pixel electrode layer 107. For this reason, the second predetermined time for the second control may be shortened.

Although the embodiments described above are directed to the liquid crystal modulation element in the perpendicular alignment mode, the voltage control in the above embodiments may be applied to the liquid crystal modulation elements after the control is modified to the form suitable for liquid crystal modulation elements other than the perpendicular alignment mode, such as TN, STN, and OCB modes.

Alternatively, the control may be also performed with a proper formation for a transmissive liquid crystal modulation element.

Although description has been given of the liquid crystal projector in the above embodiments, the present invention may apply liquid crystal display device which uses a liquid crystal modulation element other than the liquid crystal projector.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions This application claims a foreign priority benefit based on Japanese Patent Applications 2007-271852 and 2007-271853, filed on Oct. 18, 2007, which are hereby incorporated by reference herein in its entirety as if fully set forth herein.

What is claimed is:

1. A liquid crystal display apparatus, comprising:
a liquid crystal modulation element configured to modulate light from a light source, and including a first electrode, a second electrode, a liquid crystal layer disposed between the first electrode and the second electrode, a first alignment film disposed between the first electrode and the liquid crystal layer, and a second alignment film disposed between the second electrode and the liquid crystal layer; and
a controller configured to provide a first potential to the first electrode and a second potential to the second electrode such that the sign of an electric field generated in the liquid crystal layer is cyclically inverted and to make the liquid crystal modulation element perform a light modulation operation,
wherein while the light source is turned off, the controller provides a third potential to the first electrode and a fourth potential to the second electrode, such that the difference between the third potential and the fourth potential has a constant sign but a variable magnitude in an in-plane direction of the liquid crystal layer.

2. A liquid crystal display apparatus according to claim 1, wherein the controller controls turning on and off of the light source in response to a power-on and off operation of a power switch of the liquid crystal display apparatus, and the controller turns off the light source in response to the operation of the power switch, and then provides the third potential to the first electrode and the fourth potential to the second electrode.

3. A liquid crystal display apparatus according to claim 1, wherein the controller controls turning on and off of the light source in response to power-on and off operation of a power switch of the liquid crystal apparatus, and the controller provides the third potential to the first electrode and the fourth potential to the second electrode in response to the power-on operation of the power switch, and turns on the light source.

4. A liquid crystal display apparatus according to claim 1, wherein when an area where charged particles in the liquid crystal layer accumulate is defined as a first area and an area where fewer charged particles than those in the first area accumulate is defined as a second area in the in-plane direction of the liquid crystal layer, the controller sets the difference between the third and fourth potentials in the second area to be larger than that in the first area.

5. A liquid crystal display apparatus according to claim 1, wherein a direction along which the magnitude of the difference between the third potential and the fourth potential varies deviates from an alignment direction of the liquid crystal layer.

6. A liquid crystal display apparatus according to claim 1, wherein the controller provides the third potential to the first electrode and the fourth potential to the second electrode such that the potential of one of the first and second electrodes which is closer to the alignment film where charged particles in the liquid crystal layer accumulate at an interface between this alignment film and the liquid crystal layer is higher or lower than the potential of the other electrode according to the sign of the charged particles.

7. A liquid crystal display apparatus according to claim 1, wherein, before providing the third potential to the first electrode and the fourth potential to the second electrode, the controller provides a fifth potential to the first electrode and a sixth potential to the second electrode such that the difference between the fifth potential and the sixth potential has a constant sign and a constant magnitude in the in-plane direction of the liquid crystal layer.

8. A liquid crystal display apparatus according to claim 7, wherein the controller provides one of the first and second electrodes which is closer to the alignment film where charged particles in the liquid crystal layer accumulate at an interface between the liquid crystal layer with the higher or lower potential than the other electrode according to the sign of the charged particles.

9. A liquid crystal display apparatus according to claim 1, wherein the liquid crystal modulation element is a reflective liquid crystal modulation element.

10. A liquid crystal display apparatus, comprising:
a liquid crystal modulation element configured to modulate light from a light source, and including a first electrode, a second electrode, a liquid crystal layer disposed between the first electrode and the second electrode, a first alignment film disposed between the first electrode and the liquid crystal layer, and a second alignment film disposed between the second electrode and the liquid crystal layer; and
a controller configured to provide a first potential to the first electrode and a second potential to the second electrode such that the sign of an electric field generated in the liquid crystal layer is cyclically inverted and to make the liquid crystal modulation element perform a light modulation operation,
wherein the controller provides a third potential to the first electrode and a fourth potential to the second electrode, the difference between the third and fourth potentials being a potential with constant sign and variable magnitude in an in-plane direction of the liquid crystal layer before the effective light modulation area on the liquid crystal modulation element is changed from a first effective modulation area to a second effective modulation area and light modulation in the second effective light modulation area is started.

11. A liquid crystal display apparatus according to claim 10, wherein a direction along which the magnitude of the difference between the third potential and the fourth potential varies deviates from an alignment direction of the liquid crystal layer.

12. A liquid crystal display apparatus according to claim 10, wherein the controller provides one of the first and second electrodes which is closer to the alignment film where charged particles in the liquid crystal layer accumulate at an interface between this alignment film and the liquid crystal layer with a higher or lower potential than the other electrode according to a sign of the charged particles.

13. A liquid crystal display apparatus according to claim 10, wherein before providing the third potential to the first electrode and the fourth potential to the second electrode, the controller provides a fifth potential to the first electrode and a sixth potential to the second electrode such that the difference between the fifth potential and the sixth potential has a constant sign and a constant magnitude in the in-plane direction of the liquid crystal layer.

14. A liquid crystal display apparatus according to claim 13, wherein the controller provides one of the first and second electrodes which is closer to the alignment film where charged particles in the liquid crystal layer accumulate at an interface with the liquid crystal layer with a higher or lower potential than the other electrode according to the sign of the charged particles.

15. A liquid crystal display apparatus according to claim 10, wherein the liquid crystal modulation element is a reflective liquid crystal modulation element.

* * * * *